United States Patent [19]
Mori et al.

[11] Patent Number: 5,767,847
[45] Date of Patent: Jun. 16, 1998

[54] DIGITIZED DOCUMENT CIRCULATING SYSTEM WITH CIRCULATION HISTORY

[75] Inventors: Yuichi Mori, Yao; Kazuyasu Tsuiki, Osaka; Hiroshi Majima; Kenichi Aoshima, both of Yokohama; Shunsuke Akifuji, Wako; Tetsuji Toge, Kobe; Kazuhiro Suga, Ibaraki, all of Japan

[73] Assignee: Hitachi, Ltd., Tokyo, Japan

[21] Appl. No.: 531,401

[22] Filed: Sep. 21, 1995

[30] Foreign Application Priority Data

Sep. 21, 1994 [JP] Japan ................. 6-226666

[51] Int. Cl.$^6$ .............................................. G06T 1/00
[52] U.S. Cl. ........................ 345/329; 707/500; 358/402
[58] Field of Search ......................... 358/402; 395/331, 395/788–791, 209, 200.3; 707/500, 526–529; 345/331, 329

[56] References Cited

U.S. PATENT DOCUMENTS

| | | | |
|---|---|---|---|
| 4,503,499 | 3/1985 | Mason | 395/671 |
| 5,040,142 | 8/1991 | Mori | 395/772 |
| 5,125,075 | 6/1992 | Goodale et al. | 395/200 |
| 5,182,705 | 1/1993 | Barr et al. | 364/401 |
| 5,311,595 | 5/1994 | Bjerrum et al. | 380/25 |
| 5,355,304 | 10/1994 | DeMoranville | 364/413.02 |
| 5,408,333 | 4/1995 | Kojima et al. | 358/400 |
| 5,437,838 | 8/1995 | DeMoranville | 422/67 |
| 5,465,299 | 11/1995 | Matsumoto et al. | 380/23 |
| 5,515,491 | 5/1996 | Bates | 395/155 |
| 5,535,322 | 7/1996 | Hecht | 395/155 |
| 5,548,506 | 3/1994 | Srinivasen | 364/401 |
| 5,555,299 | 9/1996 | Maloney et al. | 379/212 |
| 5,581,691 | 12/1996 | Hsu | 395/182.13 |
| 5,623,653 | 4/1997 | Matsuno | 395/609 |

FOREIGN PATENT DOCUMENTS

| | | |
|---|---|---|
| 0272561A | 6/1988 | European Pat. Off. . |
| 0438020A2 | 7/1991 | European Pat. Off. . |
| 2-184142 | 7/1990 | Japan . |
| 2-278458 | 11/1990 | Japan . |
| 0477030 | 6/1992 | Japan . |
| 5-637728 | 3/1993 | Japan . |

OTHER PUBLICATIONS

Bock, Geoffrey, "TeamOffice from ICL TeamWare: finding the departmental groupware solution," The Workgroup Computing Report, Sep. 1994, v17, n9, p3(18).

Marshak, Ronni, "Rule–based messaging: using electronic mail as the vehicle for customized workflow applications," The Workgroup Computing Report, Oct. 1993, v16, n10, p3(19), Oct. 1993.

Proceedings of the Conference on Organizational Computing Systems, Atlanta, Georgia, Nov. 5–8, 1991, "A Process Model and System for Supporting Collaborative Work", S. Sarin et al, vol. 12, No. 2, 3.

Computer Communications, "Distributed System and Execution Model for Office Environments",A Schill, vol. 14, No. 8, Oct. 1991.

The Nikkei Computer Magazine, No. 336, May 2, 1994, pp. 57–67.

"UNIX White Book, stationary UNIX" pp. 87–98, Shuichi Yukita, McGraw–Hill Inc., Jul. 30, 1992.

*Primary Examiner*—Joseph H. Feild
*Attorney, Agent, or Firm*—Antonelli, Terry, Stout & Kraus, LLP

[57] ABSTRACT

A digitized document circulating system includes a unit provided in a transmission source of a digitized document and for sending the digitized document, a unit for delivering the digitized document to a transmission destination to thereby circulate the digitized document, a unit provided in the transmission destination and for receiving the digitized document, a unit operated by the delivery unit and for obtaining a circulation history containing delivery time, an identifier of the digitized document, the transmission source and the transmission destination, a unit for reading the circulation history and transferring the circulation history to a requester in response to a request for the circulation history issued from the requester, and a unit for displaying the circulation history received.

5 Claims, 18 Drawing Sheets

FIG.6

DIGITIZED DOCUMENT OBJECT "DECISION DOCUMENT 0705(523)"

| CIRCULATION OBJECT REQUEST | {decision0705, txt, decision0705, bmp} |
|---|---|
| DIGITIZED DOCUMENT TYPE | DECISION DOCUMENT |
| OWNER | USER B |
| TRANSACTION OBJECT | RESEARCH MATERIAL ORDER TRANSACTION 0705 |

FIG.7

DIGITIZED DOCUMENT OBJECT "ORDER DOCUMENT 0705(524)"

| CIRCULATION OBJECT REQUEST | {order0705, txt, order0705, bmp} |
|---|---|
| DIGITIZED DOCUMENT TYPE | ORDER DOCUMENT |
| OWNER | USER C |
| TRANSACTION OBJECT | RESEARCH MATERIAL ORDER TRANSACTION 0705 |

FIG.8

USER OBJECT "USER C(513)"

| USER | USER C |
|---|---|
| USER LOG OBJECT | LOG USER C |
| BELONGING DIGITIZED DOCUMENT OBJECT LIST | {ORDER DOCUMENT 0705} |

FIG.9

TRANSACTION FOLDER OBJECT
"RESEARCH MATERIAL ORDER TRANSACTION 0705(532)"

| BUSINESS PROCESS DEFINITION OBJECT | RESEARCH MATERIAL ORDER TRANSACTION DEFINITION |
|---|---|
| MANAGEMENT DIGITIZED DOCUMENT OBJECT LIST | {DECISION DOCUMENT 0705, ORDER DOCUMENT 0705} |
| TRANSACTION LOG OBJECT | LOG RESEARCH MATERIAL ORDER TRANSACTION 0705 |

FIG.10

REQUEST STACK OBJECT(571)

| REQUEST NUMBER | QUEUE DIGITIZED DOCUMENT OBJECT |
|---|---|
| 1 | ORDER DOCUMENT 0705 |
| 2 | ORDER DOCUMENT 0706 |
| 3 | NONE |

FIG.11

TRANSACTION LOG OBJECT
"LOG RESEARCH MATERIAL ORDER TRANSACTION 0705(562)"

| TIME | DIGITIZED DOCUMENT OBJECT | SOURCE | DESTINATION |
|---|---|---|---|
| 1994/07/06 14:35 | DECISION DOCUMENT 0705 | USER A | USER B |
| 1994/07/06 14:35 | ORDER DOCUMENT 0705 | USER A | USER C |
| 1994/07/06 15:03 | DECISION DOCUMENT 0705 | USER B | USER E |

FIG.12

USER LOG OBJECT "LOG USER C(553)"

| TIME | DIGITIZED DOCUMENT OBJECT | OPERATION |
|---|---|---|
| 1994/07/06 11:51 | ORDER DOCUMENT 0704 | RECEIVE |
| 1994/07/06 14:35 | ORDER DOCUMENT 0705 | RECEIVE |
| 1994/07/06 15:10 | ORDER DOCUMENT 0704 | SEND |
| 1994/07/06 16:33 | ORDER DOCUMENT 0706 | SEND |

FIG.13

```
#USER A
  proc(
    case(DECISION DOCUMENT),
    in(BP_START),
    out(USER B)
  ),
  proc(
    case(ORDER DOCUMENT),
    in(BP_START),
    out(USER C)
  ),
#USER B
  proc(
    case(DECISION DOCUMENT),
    in(USER A),
    out(USER E)
  ),
#USER C
  proc(
    case(ORDER DOCUMENT),
    in(USER A),
    out(USER D)
  )

#USER D
  proc(
    case(ORDER DOCUMENT),
    in(USER C),
    out(USER E)
  ),
#USER E
  proc(
    case(DECISION DOCUMENT),
    in(USER B),
    out(USER F)
  ),
  proc(
    case(ORDER DOCUMENT),
    in(USER D),
    out(USER F)
  ),
#USER F
  proc(
    case(DECISION DOCUMENT),
    in(USER E),
    out(BP_END)
  ),
  proc(
    case(ORDER DOCUMENT),
    in(USER E),
    out(BP_END)
  )
```

FIG.14

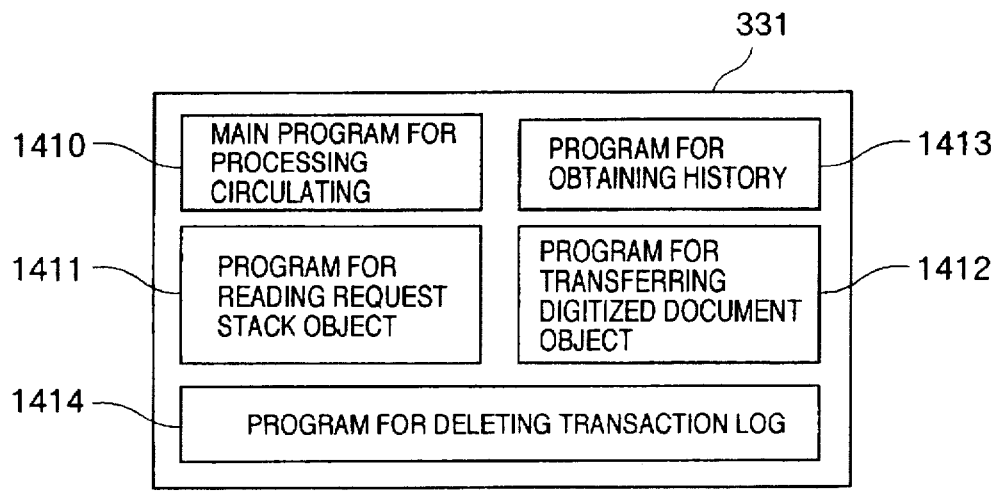

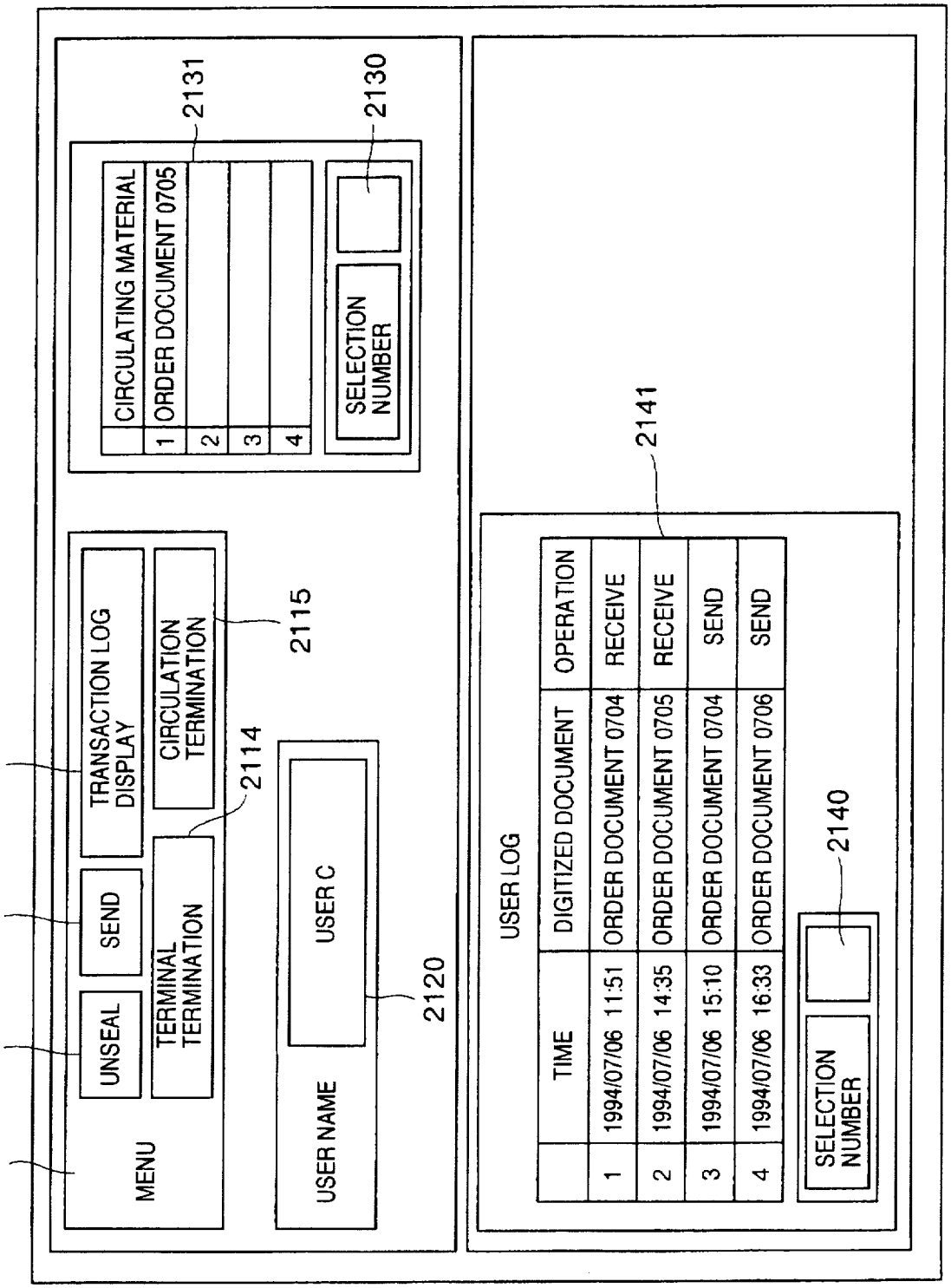

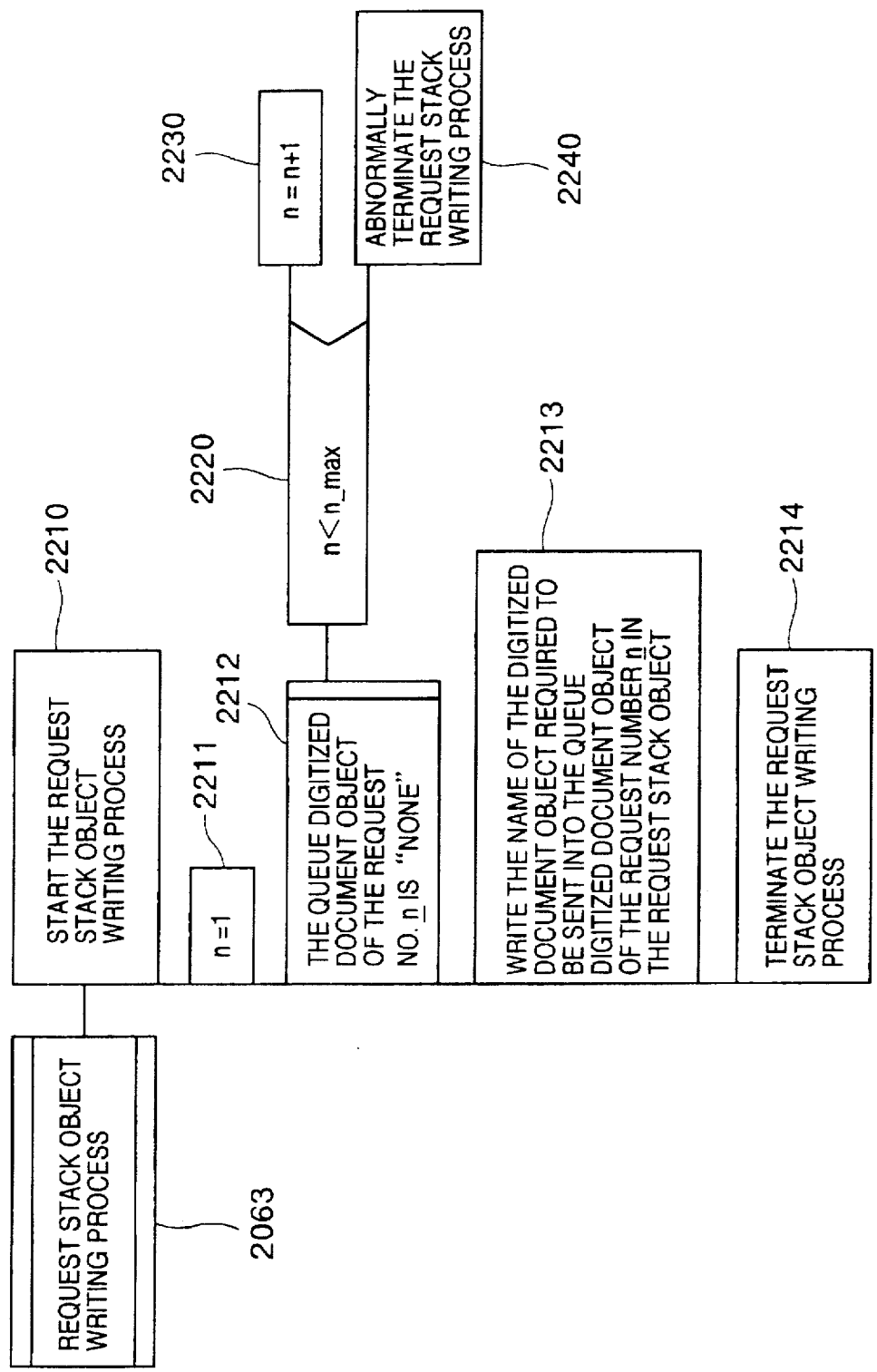

FIG.23

TRANSACTION LOG — 2310

| CIRCULATING MATERIAL | ORDER DOCUMENT 0705 — 2311 | | |
|---|---|---|---|
| TRANSACTION | RESEARCH MATERIAL ORDER TRANSACTION 0705 — 2312 | | |
| TIME | DIGITIZED DOCUMENT | SOURCE | DESTINATION |
| 1994/07/06 14:35 | DECISION DOCUMENT 0705 | USER A | USER B |
| 1994/07/06 14:35 | ORDER DOCUMENT 0705 | USER A | USER C |
| 1994/07/06 15:03 | DECISION DOCUMENT 0705 | USER B | USER E |

TRANSACTION LOG SORTED BY DIGITIZED DOCUMENT

| CIRCULATING MATERIAL | ORDER DOCUMENT 0705 — 2321 | | 2320 |
|---|---|---|---|
| TIME | SOURCE | DESTINATION | |
| 1994/07/06 14:35 | USER A | USER C | |

| CIRCULATING MATERIAL | DECISION DOCUMENT 0705 — 2331 | | 2330 |
|---|---|---|---|
| TIME | SOURCE | DESTINATION | |
| 1994/07/06 14:35 | USER A | USER B | |
| 1994/07/06 15:03 | USER B | USER E | |

FIG.24

TRANSACTION LOG SORTED BY DIGITIZED DOCUMENT
"LOG RESEARCH MATERIAL ORDER 0705(DECISION DOCUMENT 0705)"

| TIME | SOURCE | DESTINATION |
|---|---|---|
| 1994/07/06 14:35 | USER A | USER B |
| 1994/07/06 15:03 | USER B | USER E |

FIG.25

TRANSACTION LOG SORTED BY DIGITIZED DOCUMENT
"LOG RESEARCH MATERIAL ORDER 0705(ORDER DOCUMENT 0705)"

| TIME | SOURCE | DESTINATION |
|---|---|---|
| 1994/07/06 14:35 | USER A | USER C |

DIGITIZED DOCUMENT CIRCULATING SYSTEM WITH CIRCULATION HISTORY

BACKGROUND OF THE INVENTION

1. Field of the Invention

The present invention relates to a digitized document circulating system and particularly relates to a digitized document circulating system in which when a digitized document prepared for circulation is read by a user, the user can receive history information of a plurality of other digitized documents relevant to the digitized document read by the user.

2. Description of the Related Art

As the prices of personal computers, word processors, or the like, fall down, a large number of office workers try to generate documents or tables in the form of digitized documents. To attain an improvement in productivity of such office workers, there has been made greater the demand for a digitized document circulating system in which group work of office workers in practical business is modeled as a flow (business process) of documents along a circulation path so that digitized documents are automatically circulated along the circulation path.

Such a system has been disclosed in U.S. patent application Ser. No. 08/531,652, filed simultaneously with this application on Sep. 21, 1995, pending the disclosure of that application is incorporated herein by reference.

If, in group work of office workers using the aforementioned system, each user merely independently goes on with work (processing of digitized documents circulated) assigned to the user, the independent work may hinder the group work. One of important points for an improvement in productivity is that each user performs his or her duty while grasping the total image of group work by understanding the significance of assigned work (what path is used for circulating the work) and following up already processed work (how the work progresses after that) by reference to a history of work of related workers, that is, by reference to a history of circulated digitized documents.

Electronic mail is known as a simple group work system. In the electronic mail system, messages (a kind of digitized document) are transmitted/ received through a network system between computers. As described in "UNIX WHITE BOOK, stationary UNIX" (pp.87–98, written by Shuichi Yukita and published by McGraw-Hill, Inc., Jul. 30, 1992), a destination (an example of the simplest circulation path) and history information (record of circulation of electronic mail) including the sending time, the sender's name, the receiving time, the receiver's name and the title, are inserted as additional information in front of the body of a message. A receiver can know the history of the electronic mail on the basis of this additional information.

In the "method for confirming and controlling transmission of a plurality of electronic mail objects" disclosed in Jp-A-2-184142, the following functions have been disclosed in addition to the aforementioned electronic mail function.
(1) A function for storing a copy of a transmitted electronic mail as a sender side log;
(2) A function for sending an electronic mail for confirmation from a receiver back to the sender when the receiver receives an electronic mail; and
(3) A function for sending an electronic mail again from the sender to the receiver when no electronic mail for confirmation is sent in a predetermined time.

According to the technique of Jp-A-2-184142, the receiver can procure the history of a electronic mail and the sender can confirm the arrival of a electronic mail.

In the "office information processing system" disclosed in Jp-A-5-63728, the following functions are provided in addition to the aforementioned electronic mail function and the functions described in Jp-A-2-184142.
(1) A function in which the transmission side of a electronic mail inquires of the reception side about the state of processing of an electronic mail; and
(2) A function in which the reception side replies to the inquiry of (1).

According to Jp-A-5-63728, the receiver can procure the history of an electronic mail and the sender can also procure the state of processing of an electronic mail on the reception side.

In transactions subjected to the afore-mentioned digitized document circulating system, there are a lot of transactions in which a plurality of digitized documents are circulated in a manner so that they are circulated parallelly through different paths respectively and are collected to one place at a certain point of time. For example, there is such a transaction that in an ordering transaction, a decision document and an order document are generated by the planning department and the research department respectively and separately, but those documents are collected into one as an order sheet to obtain permission of the accounting department's manager and then an ordering slip is issued from the material department. In such a transaction, the efficiency for fulfilling the transaction is improved if a user can refer to the histories of digitized documents which are not passed through the user. For example, the minimum requirement for obtaining permission of the accounting department's manager is a set of a decision document and an order document. To fulfill the transaction more smoothly, there is required a flexible measure which is such that the planning department procures the history information of the order document from the research department to check the state of progress of work and the decision document is preferentially generated when the request document has been handed to the accounting department's manager.

In the aforementioned conventional technique, however, no consideration is taken of the user's referring to the history information of digitized documents which are not circulated to the user. Hereinafter, a series of flow of digitized documents in a transaction which is made to progress by circulation of the digitized documents among a plurality of users is called "transaction".

An object of the present invention is to provide a digitized document circulating system in which users can refer to circulation history information (transaction log) of all digitized documents in one and the same transaction.

In the aforementioned conventional technique, each user can refer to the state of processing of processed digitized documents by using the histories (user log) of the digitized documents circulated to the user, but the user cannot refer to the state of processing of digitized documents not circulated to the user.

Another object of the present invention is to provide a digitized document circulating system in which each user can refer to the state of processing of all digitized documents contained in a transaction by using a user log.

The present invention provides a digitized document circulating system in which when a digitized document is transferred, the circulation history of a transaction concerning the digitized document is procured so that the circulation history is displayed for the user in response to an order from the user.

Further, the present invention provides a digitized document circulating system in which a user log is displayed so that circulation histories concerning digitized documents assigned from the user log are displayed for users.

Digitized documents to be circulated and transactions are stored in a condition that they are correlated with each other, so that when a digitized document is transferred, the circulation history of a transaction concerned with the digitized document can be accessed. Accordingly, the circulation history of a concerned transaction can be procured whenever a digitized document is transferred, so that the circulation histories of transactions can be accumulated.

Because the user log records the histories of all digitized documents circulated to users, the circulation history of a transaction concerned with a specific digitized document can be accessed by displaying the user log and designating the specific digitized document.

BRIEF DESCRIPTION OF THE DRAWINGS

Further objects, features and advantages of the present invention will become more clear from the following detailed description of a preferred embodiment, described with respect to the accompanying drawing.

FIG. 6 is a view showing an example of data contained in a digitized document object "decision document 0705 (523)" depicted in FIG. 5;

FIG. 7 is a view showing an example of data contained in a digitized document object "order document 0705 (524)" depicted in FIG. 5;

FIG. 8 is a view showing an example of data contained in a user object "user C (513)" depicted in FIG. 5;

FIG. 9 is a view showing an example of data contained in a transaction folder object "research material order 0705 (532)" depicted in FIG. 5;

FIG. 10 is a view showing an example of data contained in a request stack object 571 depicted in FIG. 5;

FIG. 11 is a view showing an example of data contained in a transaction log object "log research material order 0705 (562)" depicted in FIG. 5;

FIG. 12 is a view showing an example of data contained in a user log object "log user C (553)" depicted in FIG. 5;

FIG. 13 is a view showing an example of data contained in a business process definition object "research material request transaction definition (541)" depicted in FIG. 5;

FIG. 14 is a configuration diagram of a processing program block 331 depicted in FIG. 3;

FIG. 21 is a view of a first example of display on a display unit 443 in FIG. 4;

FIG. 22 is a PAD view of a request stack object writing process 2063 in FIG. 20;

FIG. 23 is a view of a second example of display on the display unit 443 in FIG. 4;

FIG. 24 is a view of an example of data in a digitized document-sorted transaction log "log research material order transaction 0705 (decision document 0705 )"; and FIG. 25 is a view of another example of data in a digitized document-sorted transaction log "log research material order transaction 0705 (decision document 0705 )".

DETAILED DESCRIPTION OF THE PREFERRED EMBODIMENT (1) Configuration of Digitized Document Circulating System FIG. 2 is a schematic view of a digitized document circulating system as an embodiment of the present invention. The digitized document circulating system 201 comprises a server 211 for managing and circulating digitized documents, user terminals 212 to 217 in which users process the digitized documents circulated by the user, and a network system 218 for connecting the server 211 to the user terminals 212 to 217. The user terminals 212 to 217 are respectively assigned to users A to F of this system. Although FIG. 2 shows 6 terminals as an example, the number of terminals is not limited to 6. For example, one user may use a plurality of user terminals or one user terminal may be shared by a plurality of users.

As will be described later in detail, this digitized document circulating system is roughly designed so that users receive digitized documents, edit the digitized documents and pass the digitized documents on to the next through user terminals 212 to 217 whereas the server 211 transmits the digitized documents designated by the users, successively.

Figure 3:
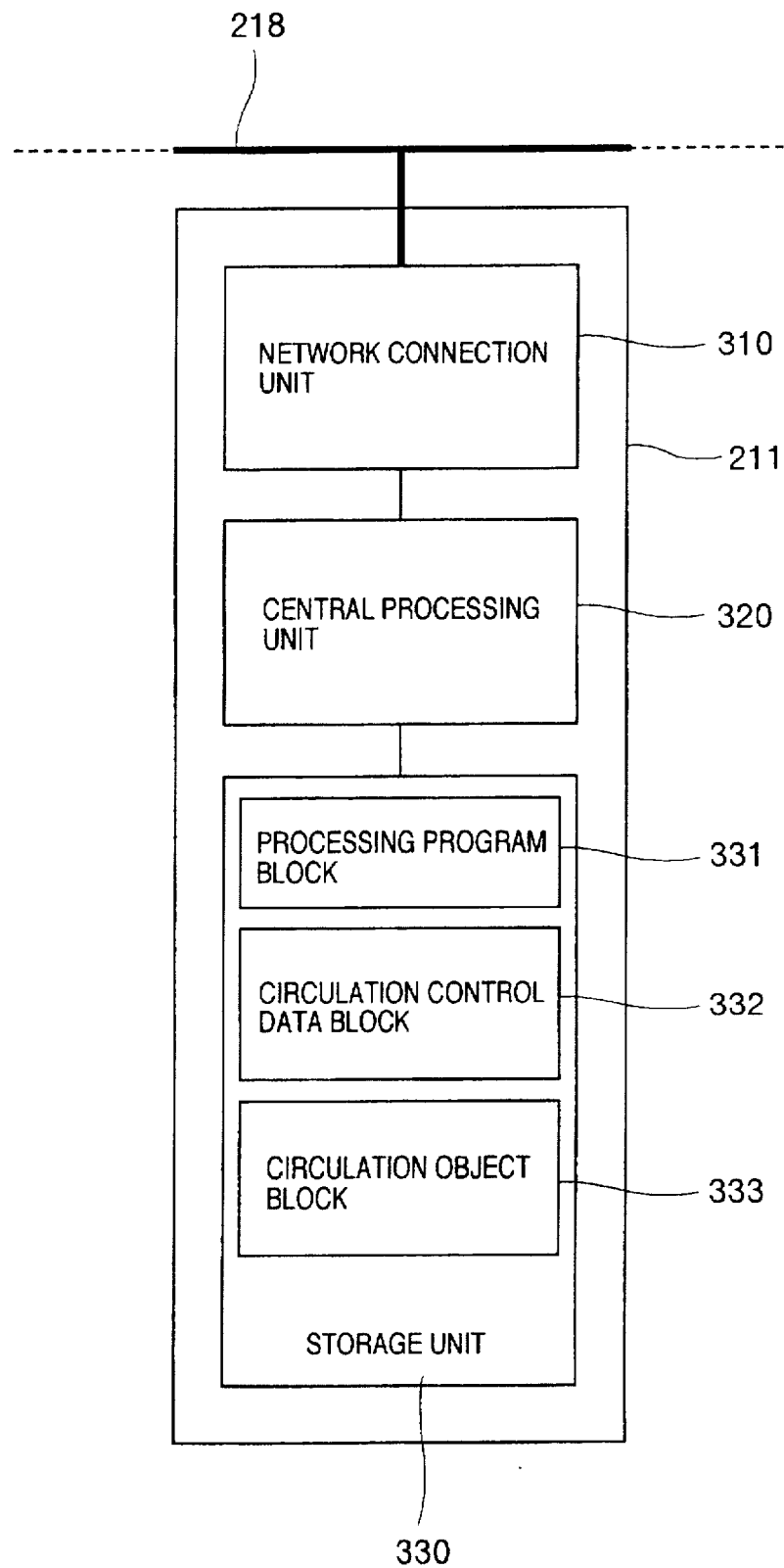
FIG. 3 is a configuration diagram of a server 211 of FIG. 2.

FIG. 3 shows the configuration of the server 211. The server 211 includes a storage unit 330, a central processing unit 320, and a network connection unit 310. The storage unit 330 stores a processing program block 331 in which a procedure for processing circulation of digitized documents is described, a circulation control data block 332 composed of a plurality of control data required for user management and digitized document circulation, and a digitized document block 333 composed of a plurality of digitized documents to be circulated. The central processing unit 320 reads a processing program from the processing program block 331 and performs digitized document circulation. The network connection unit 310 connects the user terminals 212 to 217 and the server 211 through the network system 218 so that data are transmitted/ received between the server 211 and the user terminals 212 to 217.

Figure 4:
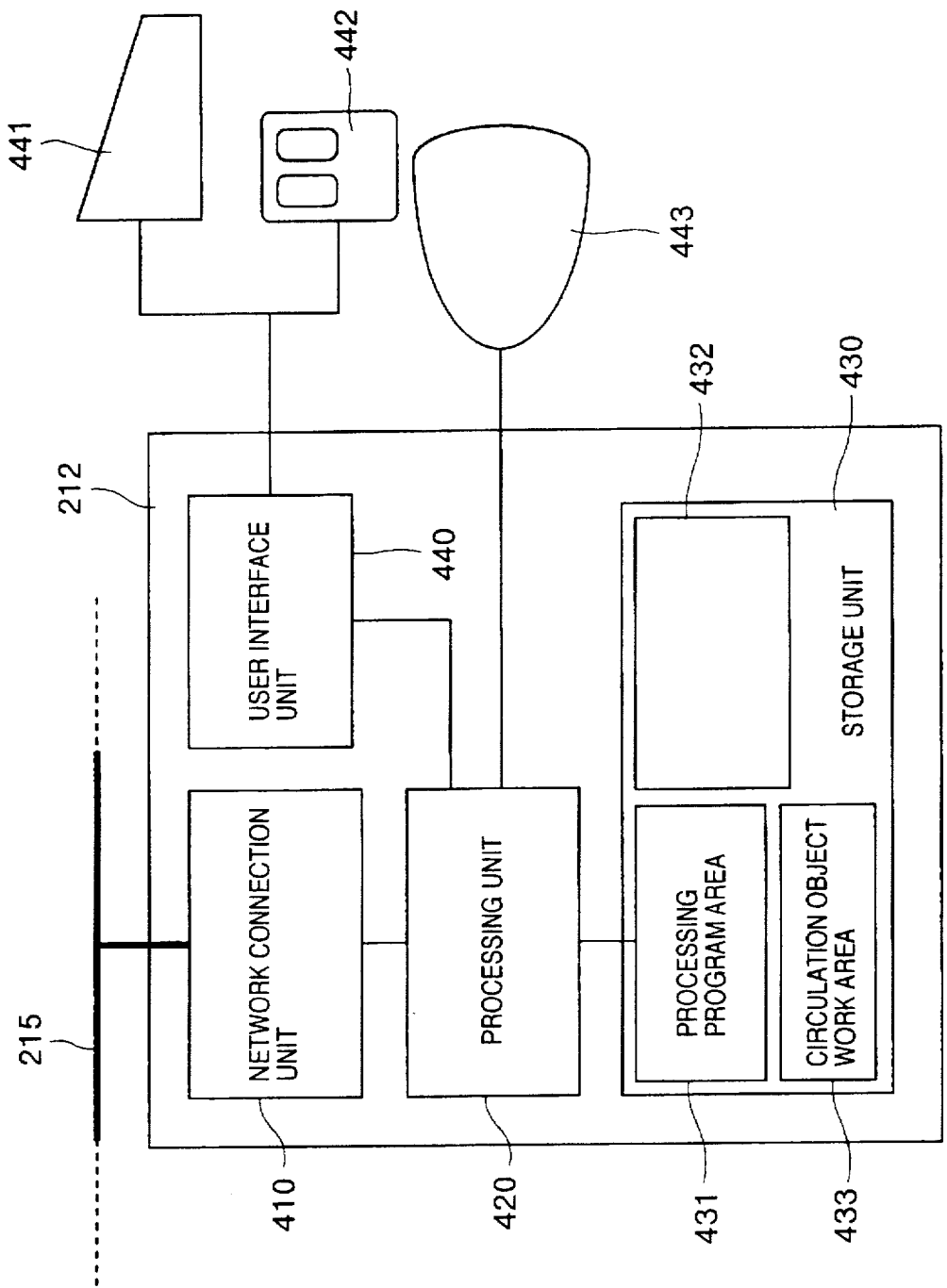
FIG. 4 is a configuration diagram of a user terminal 212 of FIG. 2.

FIG. 4 shows the general configuration of a user terminal 212. A storage unit 430 includes a processing program 431 in which a procedure for processing a digitized document circulated is described, a circulation object work area 433 which is an area for copying an object transmitted from the server, that is, copying a digitized document in order to refer to or edit the circulation object; and an application program area 432 for referring to and editing the circulation object. A processing unit 420 reads a processing program 431 from the storage unit 430 and performs terminal processing. A network connection unit 410 connects the user terminal 212 and the server 211 through the network 218. A user interface 440 feeds an input from a keyboard 441 or a mouse 442 to the processing unit 420. A display unit 443 displays processing results of the processing unit.

(2) Data stored in Storage Unit 330 of Server 211

Next, data stored in the storage unit 330 of the server 211 will be described in detail with reference to FIGS. 3 and 5. Hereinafter "block" means an area which is contained in the storage unit 330 and in which the same kind of data (objects) are stored.

(2-1) Circulation Object Block

The circulation object block 333 shown in FIG. 3 is composed of a plurality of circulation objects which are circulated to users. The "circulation object" means a digitized still image, an animation image, a voice, a text or a combination thereof.

(2-2) Circulation Control Data Block

Figure 5:
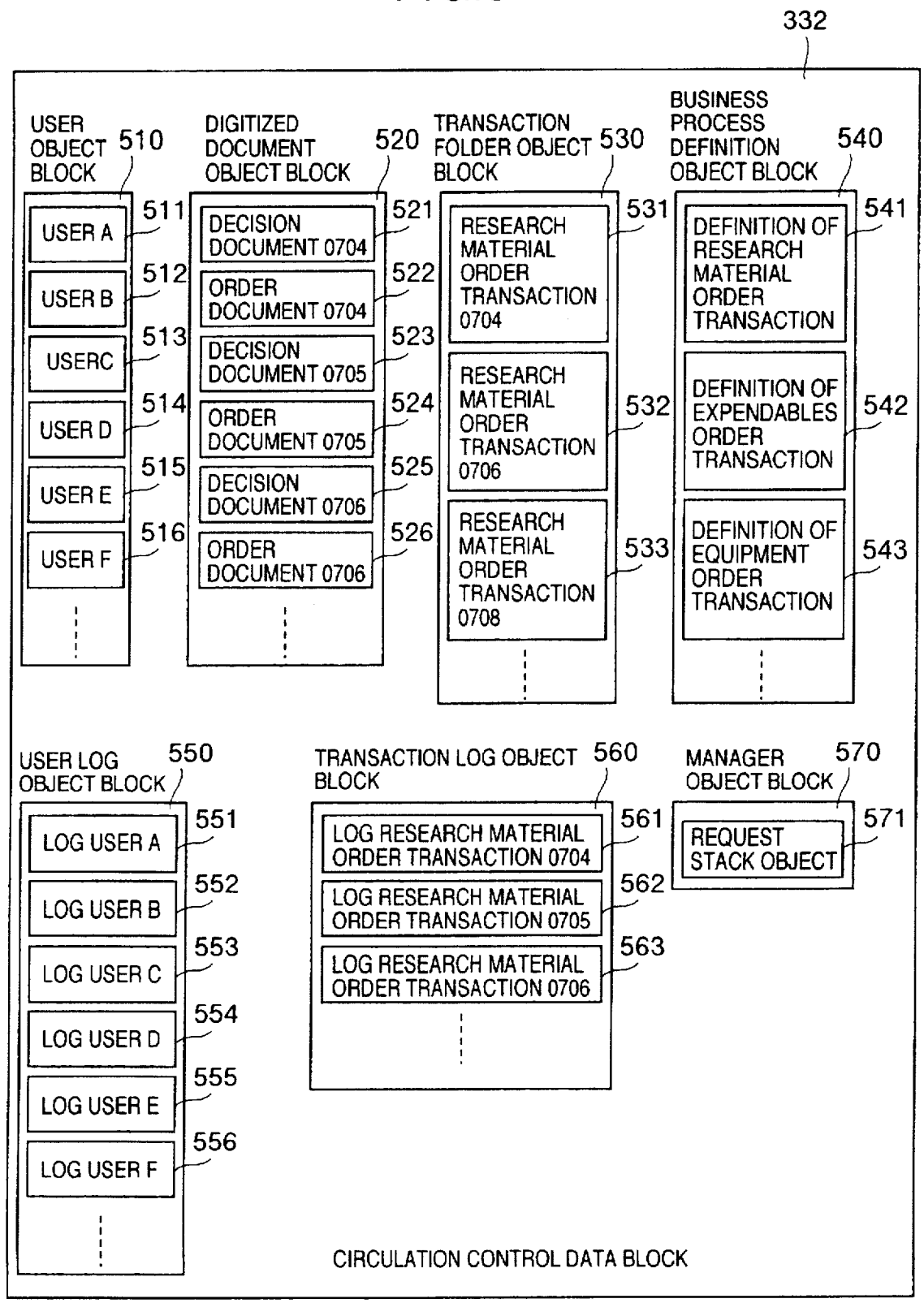
FIG. 5 is a configuration diagram of a circulation control object block 333 stored in a storage unit 330 depicted in FIG. 3.

The circulation control data block 332 of FIG. 3 is composed of object blocks shown in FIG. 5.

The user object block 510 is composed of user objects containing user information assigned to users A to F, respectively.

The business process definition object block 540 is composed of business process definition objects which is a script in which business process definitions are described. A business process definition object "research material order transaction definition 541" defines a digitized document circulating transaction shown in FIG. 1.

The transaction folder object block 530 is composed of transaction folder objects which are information for managing all digitized document objects of transactions in a business process defined by the business process definition. The transaction folder objects 531 to 533 are assigned to transactions 0704, 0705 and 0706. The transaction folder has a function for generally managing a plurality of digitized document objects.

The digitized document object block 520 is composed of digitized document objects which are management information for circulating one or a plurality of circulation objects as one digitized document. The digitized document objects 521 and 522 are circulated in a transaction "research material order transaction 0704," the digitized document objects 523 and 524 are circulated in a transaction "research material order transaction 0705", and the digitized document objects 525 and 526 are circulated in a transaction, "research material order transaction 0706".

The manager object block 570 has a request stack object 571 which is a data object for controlling the whole of the digitized document circulating system. The request stack object is a first-in first-out stack for storing the name of a digitized document object requested by a user to be transferred.

The transaction log object block 560 which is characteristic of the present invention has transaction log objects in which the circulation history of all digitized documents contained in the transactions, that is, the circulation history of all digitized document objects managed by the transaction folders is stored. The transaction log objects 561 to 563 relate to the transactions "research material order transaction 0704", "research material order transaction 0705", and "research material order transaction 0706", respectively.

The user log object block 550 are composed of a plurality of objects containing user logs of users A 551 to F 556.

FIG. 6 shows the details of the digitized document object "decision document 0705 (523)".

The item "circulation object list" is a name list of circulation objects managed by the digitized document object "decision document 0705 (523)".

The item "digitized document type" is a name which is used in business process definition in order to define the type of the digitized document to be circulated. The item value "decision document" corresponds to "decision document 111".

The item "owner" is the name of a current user which uses the digitized document object.

The item "transaction object" is the name of a transaction folder object which manages the digitized document object. The digitized document object 523 is managed by the transaction folder object 532.

FIG. 7 shows the details of a digitized document object "order document 0705 (524)". Here, the "order document 0705" is an identifier of the digitized document.

The item "circulation object list" is a list of names of circulation objects managed by the digitized document object "decision document 0705 (524)". The circulation objects contain a text "order0705 .txt" and a bit map data "order0705 .bmp".

Figure 1:
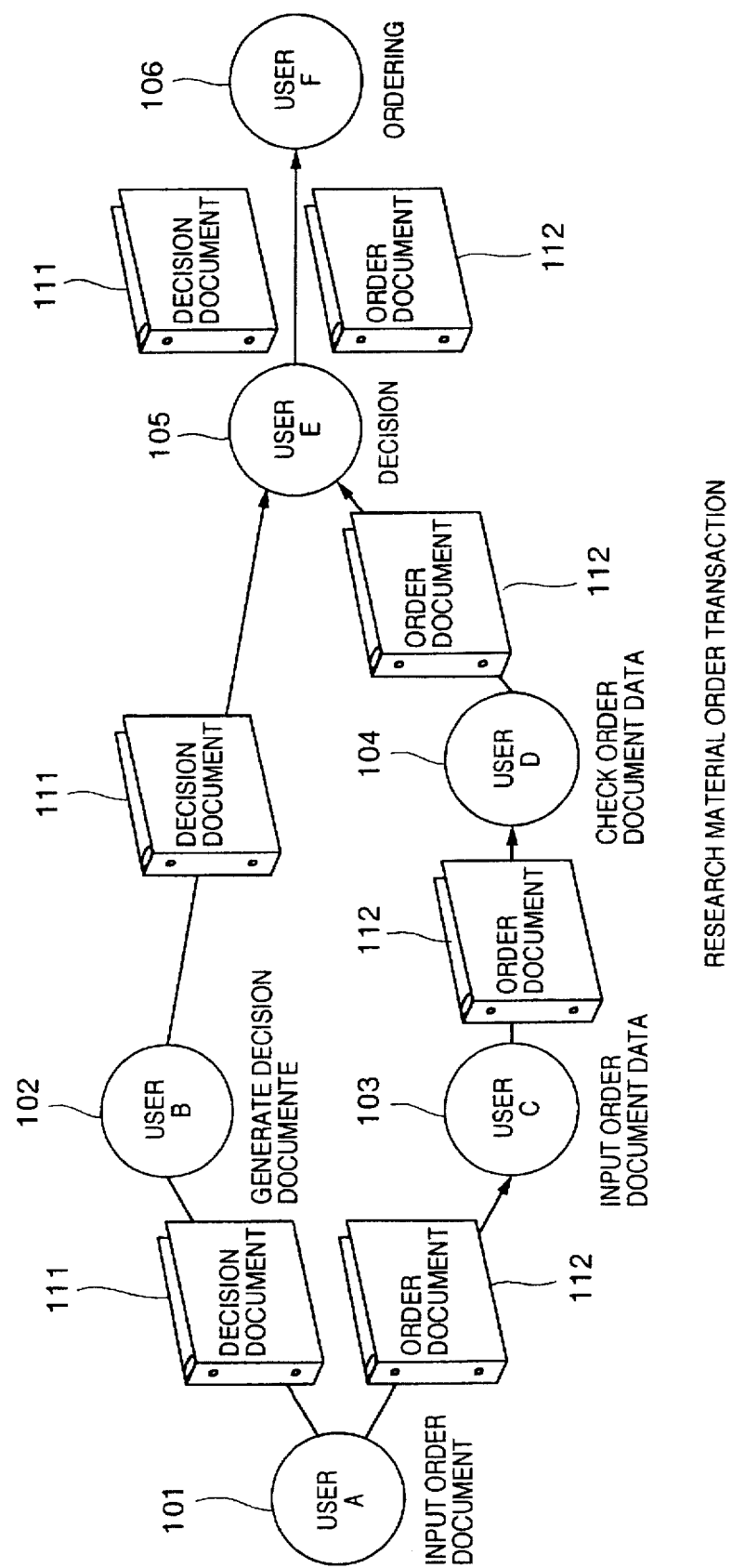
FIG. 1 is a conceptual view of a business process definition, that is, "Definition of Transaction process for Ordering Research Materials"
Figure 2:
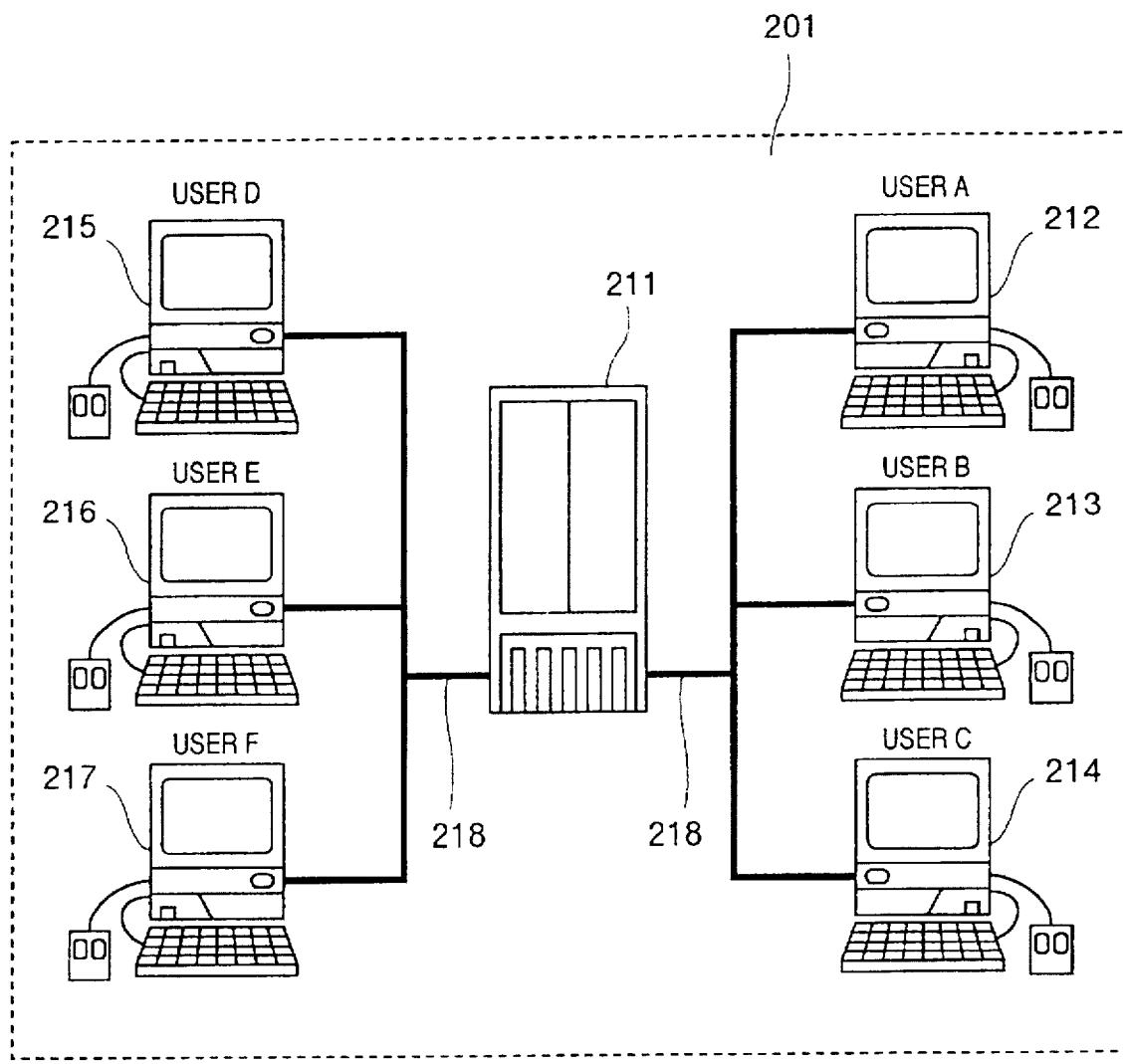
FIG. 2 is a configuration diagram of a digitized document circulating system according to the present invention.

The item "digitized document type" is the name of the type of the digitized document to be circulated. For example, the item value is "order document" 112 (FIG. 1).

The item "owner" is the name of a current user which uses the digitized document object. For example, the item value is "user C".

The item "transaction object" is the name of a transaction folder object which manages the digitized document object. The item value "research material order transaction 0705 (532)" indicates the fact that the digitized document object is managed by the transaction folder object "research material order transaction 0705 (532)".

The digitized document object "decision document 0705 (523)" and the digitized document object "order document 0705 (524)" are both managed by the transaction folder object "research material order 0705 (532)".

FIG. 8 shows the details of a user object "user C (513)" as an example of the user object.

The item "user" is the name of a user which is a subject of the user object. The item value "user C" indicates the fact that the user object "user C (513)" is the user object of the user C.

The item "user log object" is the name of a user log object concerning the user C who uses the user object "user C (513)". The item value "log user C" indicates the fact that the user log object having the user log of the user C using the user object "user C (513)" is the user log object "user C (553)".

The item "belonging digitized document object list" means a list of digitized document objects circulated to the user C.

FIG. 9 shows the detail of a transaction folder object "research material order 0705 (532)" as an example of the transaction folder object.

The item "business process definition object" is the name of a business process definition object by which a business process for defining a transaction requiring circulation of digitized document objects managed by the transaction folder object is defined. The item value "research material order transaction definition" indicates the fact that the business process definition object for defining a transaction requiring circulation of digitized document objects managed by the transaction folder object "research material order 0705 (532)" is the business process definition object "research material order transaction definition 541".

The item "management digitized document object list" is a list of names of digitized document objects managed by the transaction folder object. The item value "{decision document 0705, order document 0705}"indicates the fact that digitized document objects managed by the transaction folder object are "decision document 0705 (523)" and "order document 0705 (524)".

The item "transaction log object" is the name of a transaction log object for procuring a transaction log which is the circulation history of digitized documents object managed by the transaction folder object. The item value "log research material order 0705" indicates the fact that the transaction log object concerning the transaction folder object has an identification "log research material order transaction 0705 (562)".

In FIG. 9, the transaction folder object "research material order 0705 (523)" manages digitized document objects "decision document 0705 (523)" and "order document 0705 (524)" circulated on the basis of the business process definition object "research material order transaction definition (541)". The circulation history of the digitized document objects "decision document 0705 (523)" and "order document 0705 (524)" is stored as the item value "log research material order transaction 0705 (562)" in the transaction log object.

FIG. 10 shows the detail of a request stack object 571. The item "queue digitized document object" is the name of a digitized document object written in the request stack object 571 by the user terminal. The item value "none" indicates the fact that there is no digitized document object name written in the corresponding request number. The item "request number" is the request order number of a queue digitized document object. As will be described later in detail, the request stack is a definite stack of first-in first-out, and the request number is provided for first-in first-out control. The request stack object shown in FIG. 10 indicates the fact that digitized document objects "order document 0705 (524)" and "order document 0706 (526)" are queue digitized document objects.

As an example of a transaction log object which is characteristic of the digitized document circulation system provided by the present invention, a transaction log object "log research material order 0705 (562)" is shown in detail in FIG. 11. History data which are procured as a transaction log are composed of time, digitized document object, source, and destination. The transaction log object is formed by arranging these history data in time sequence. The item "source" indicates the name of a user which requests sending (circulation) of a digitized document object. The item "destination" indicates the name of the next user to which the digitized document object is circulated. The item "digitized document object" indicates the name of the digitized document object to be sent. The item "time" indicates a point of time of sending.

FIG. 12 shows a user log object "log user C (553)" as an example of the user log object. History data procured as a user log are composed of time, digitized document object, and operation. The user log object is formed by arranging these history data in time sequence. "Receive" or "send" is recorded in the item "operation". The "receive" indicates the fact that the digitized document is received. The "send" indicates the fact that the digitized document is required to be sent. The item "digitized document object" indicates the name of the digitized document object to be sent. The item "time" indicates a point of time of carrying the operation.

FIG. 13 shows in detail the description of the business process definition object "research material order transaction definition 541". The interpretation of the description will be described later.

(2-3) Processing Program Block

As shown in FIG. 14, the processing program block 331 is composed of a circulating main program 1410 for expressing the outline of circulation, a request stack object reading program 1411 for expressing a procedure of reading the request stack object 571, a digitized document object transferring program 1412 for expressing a procedure of transferring the digitized document object, a history procuring program 1413 for expressing a procedure of procuring a transaction log and a user log, and a transaction log deleting program 1414 for expressing a procedure of deleting a transaction log object. These programs will be described later.

(3) Data stored in Storage Unit 430 of User Terminal 212

As shown in FIG. 4, a processing program 431, an application program area 432 and a circulation object work area 433 are stored in the storage unit 430.

(3-1) Processing Program 431

A procedure of processing in a user terminal is described in the processing program which will be described later.

(3-2) Application Program Block 432

The block contains an application program for editing the digitized document, such as a word processor, or the like.

(3-3) Circulation Object Work Area 433

This is a storage area in which the circulation object stored in the circulation object block 333 of the server 211 is copied to the storage unit 430 of the user terminal 212 through the network system 218 in order to edit the circulated object by using the application program. The edition of the circulation object in the user terminal 212 is performed by editing a copy of the circulation object in the circulation object work area 433. After the edition, the circulation object is updated by overwriting the edited copy on the circulation object stored in the circulation object block 333 of the server 211 through the network system 218.

(4) Description of Digitized Document Circulating Procedure (4-1) Outline of Circulating Transaction First, the digitized document circulating transaction will be described in brief.

FIG. 1 shows a flow of research material order transaction to be processed. Users A (101) to F (106) include processes performed by user terminals, and processes in which users A to F receive digitized documents, edit the digitized documents and send the digitized documents to the next user by operating user terminals. The arrows connecting the users A (101) to F (106) express a flow of digitized document circulation. The server 211 transfers a digitized document requested to be sent by a user located in the start of each arrow to a user located in the end of the arrow. The "decision document" 111 and "order document" 112 located on each arrow are digitized documents transferred along the arrow.

A flow of the research material order transaction will be described below. To start the research material order transaction, the user A 101 requests the sending of two digitized documents, that is, the "decision document" 111 and "order document" 112 from the user terminal. The server 211 delivers one digitized document, that is, the "decision document" 111 to the user B (102) and delivers the other digitized document, that is, the "order document" 112, to the user C (103).

The user B (102) edits the digitized document received from the user A (101) by using an application program in the user terminal to thereby complete the digitized document and requests the server 211 to transfer the thus edited digitized document. The server 211 delivers the digitized document to the user E (105).

The user C (103) inputs data of the digitized document received from the user A (101) by using an application program in the user terminal and, after completion of input, requests the server 211 to transfer the digitized document. The server 211 delivers the digitized document to the user D (104).

The user D (104) checks the digitized document received from the user C (103) by using an application program in the user terminal and requests the server 211 to transfer the thus checked digitized document after completion of the check. The server 211 delivers the digitized document to the user E (105).

After reception of the two digitized documents from the users B (102) and D (104) respectively, the user E (105) makes a decision by using an application program in the user terminal and requests the server 211 to transfer the digitized documents. The server 211 delivers the digitized documents to the user F (106) which will perform ordering.

The user F (106) performs ordering by using an application program in the user terminal on the basis of the digitized documents, that is, the "decision document" 111 and "order document" 112 received from the user E 105. When ordering is completed, this transaction is finished.

A business process definition, for example, business process definition object "research material order transaction definition (541)" expresses the aforementioned flow of delivery of digitized documents. The term "transaction", for example, "research material order transaction 0705" means a series of procedures for research material order transaction.

(4-2) Circulation Procedure

The procedure of circulating digitized documents is described in processing programs contained in the processing program block 331 of the server 211 and the processing program area 431 of each user terminal.

(4-2-1) Digitized Document Circulating Procedure in Server

The digitized document circulating procedure in the server 211 is a procedure for transferring digitized documents from user to user. This procedure is stored as a processing program in the processing program block 331. The request stack object reading program 1411, the digitized document object transferring program 1412, the history procuring program 1413 and the transaction log deleting program 1414 are sub-routines of the circulating main program 1410. Description will be made along the procedure of the circulating main program 1410 inclusive of the description of these sub-routines.

Figure 15:
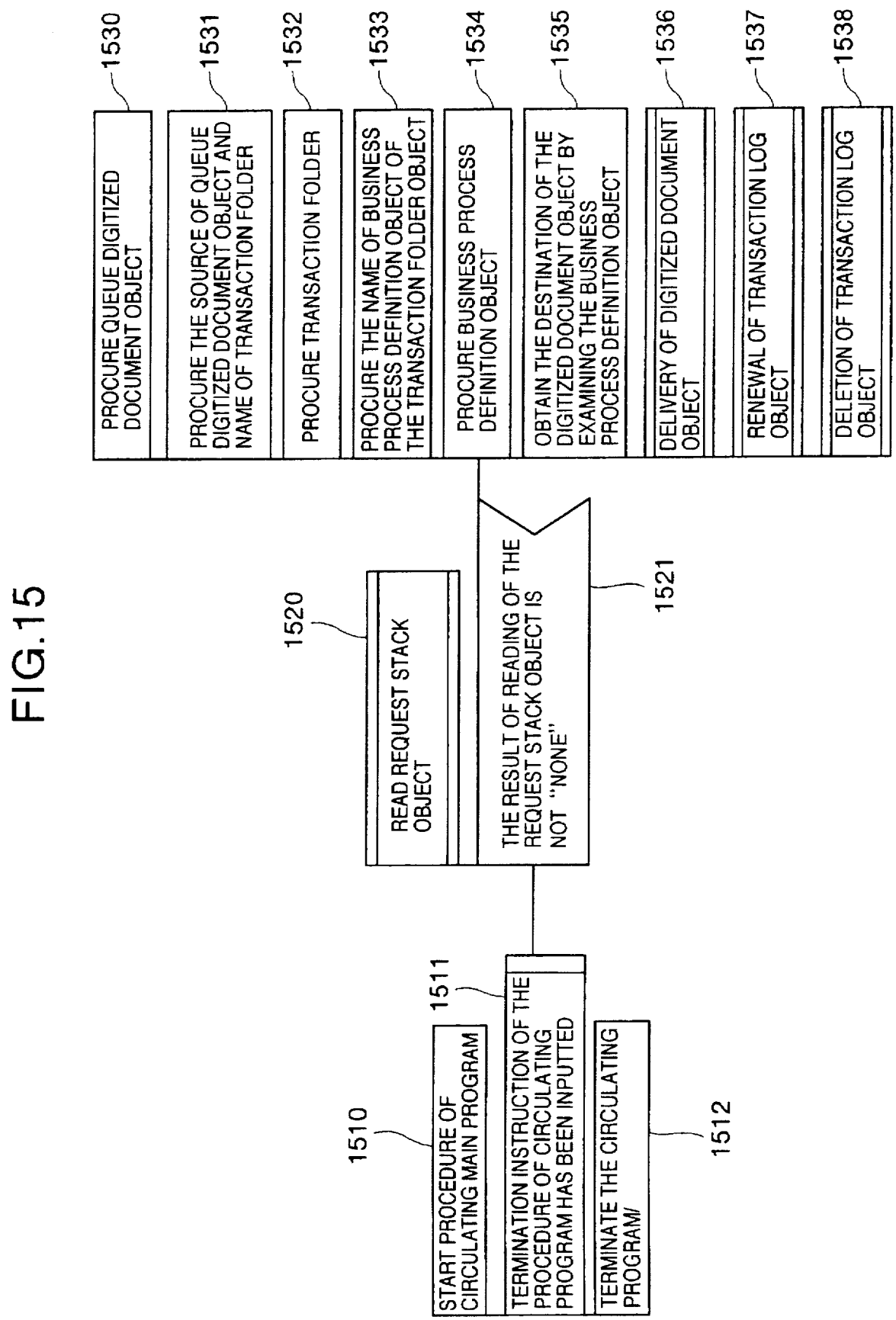
FIG. 15 is a PAD view of a circulating main program 1410 in FIG. 14.

A procedure shown in the PAD view of FIG. 15 is described in the circulating main program 1410. In step 1510, the procedure of the circulating main program starts. In step 1511, the procedure in and after step 1520 is repeated unless a termination instruction is given from the user terminal. When the termination instruction is given from the user terminal, the situation of the routine goes to step 1512. In the step 1512, the procedure of the circulating main program is terminated. In the step 1520, a request stack object 571 is read.

Figure 16:
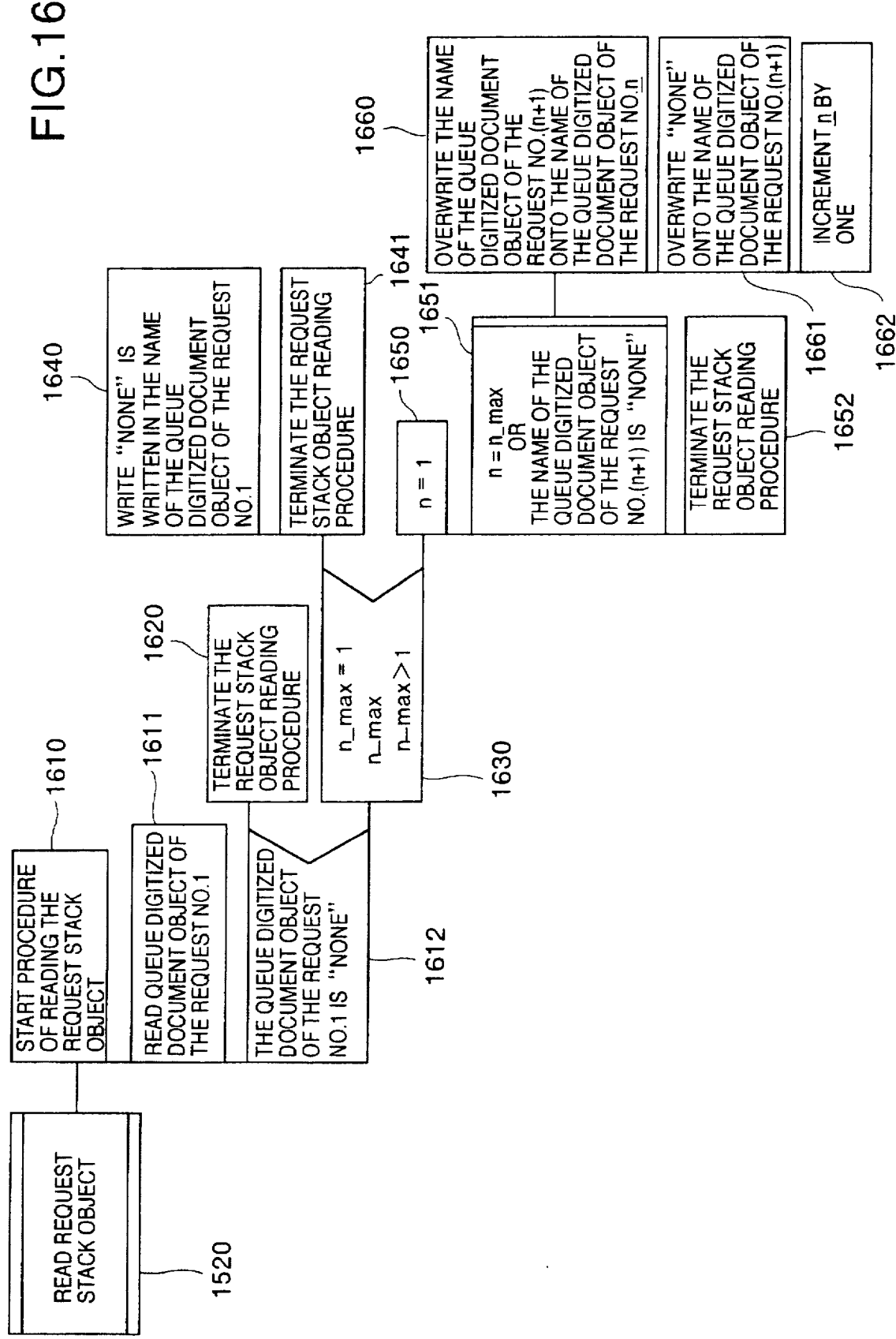
FIG. 16 is a PAD view of a request stack object reading program 1411 in FIG. 14.

FIG. 16 is a PAD view showing a procedure of reading the request stack object 571. In step 1610, the procedure of reading the request stack object starts. In step 1611, a queue digitized document object of the request number 1 is read as a result of reading. When the queue digitized document object of the request number 1 is "none" in step 1612, the procedure in and after step 1620 is carried out. Otherwise in the step 1612, the procedure in and after step 1630 is carried out. In the step 1620, the result of reading is regarded as "none" and the request stack object reading procedure is terminated. The request stack object is a first-in first-out stack. In the procedure of steps 1630 to 1662, the stack of the request number 1 is cleared and data in the stack is shifted. In the step 1630, a judgment is made as to whether the maximum stack number n__max of request stack objects is 1 or not (n__max≧1). In the case of n__max=1, the procedure in and after step 1640 is carried out. In the case of n__max>1, the procedure in and after step 1650 is carried out. In the step 1640, "none" is written in the queue digitized document object of the request number 1 and then the situation of the routine goes to step 1641. In the step 1641, this request stack object reading procedure is terminated. In the step 1650, the initial value of $n$ which is a counter variable for the request number is set to 1. In step 1651, the procedure in and after step 1660 is carried out unless n=n__max is valid or the queue digitized document object of the request number (n+1) is "none". When n=n__max is valid or when the queue digitized document object of the request number (n+1) is "none", the situation of the routine goes to step 1652. In the step 1652, the request stack object reading procedure is terminated. In the step 1660, the queue digitized document object of the request number (n+1) is overwritten onto the queue digitized document object of the request number $n$ and then the situation of the routine goes to step 1661. In the step 1661, "none" is overwritten onto the queue digitized document object of the request number (n+1). In step 1662, $n$ is increased by 1. Thus, the request stack object 571 is read out by the aforementioned procedure.

In the case of the request stack object shown in FIG. 10, the digitized document object "order document 0705" of the request number 1 is read out. When the reading of the request stack object is completed, "order document 0705" is obtained as a reading result.

Returning to the description of FIG. 15, when the result of reading of the request stack object is not "none" in step 1521, the procedure in and after step 1530 is carried out. When the result of reading of the request stack object is contrariwise "none", the procedure of the step 1521 is terminated and the situation of the routine goes to step 1511. In the step 1530, a queue digitized document object is procured from the digitized document object name read in the step 1520. In step 1531, the name of an owner and the name of a transaction folder object are procured from the digitized document object procured in the step 1530. Because the owner is a user requesting the server to transfer the digitized document object to the next user, it is said that the owner is a source of the digitized document object. In step 1532, a transaction folder object is procured from the transaction folder object name procured in the step 1531. In step 1533, the name of a business process definition object is procured from the transaction folder object procured in the step 1532. In step 1534, a business process definition object is procured from the business process definition object name procured in the step 1533. As described above, in the case of the request stack object shown in FIG. 10, "order document 0705" is obtained as a result of reading. From the digitized document object "order document 0705 (524)", it is found that the owner is "user C", the transaction folder object is "research material order 0705 (562)" and the business process definition object is "research material order transaction definition 541". In step 1535, the destination of the digitized document object is obtained by examining the business process definition object procured in the step 1534.

A business process definition is constituted by a combination of scripts as follows.

current user name (owner name)
proc(
    type(digitized document type name),
    next(next owner name)
)

The source of the digitized document object is described as owner name of the digitized document object after #. Description about one digitized document type is bracketed in proc( ). The digitized document type is described in type( ), and the name of a user which is the destination of the digitized document object is described in next( ).

Here, the method of interpreting the business process definition object will be described with reference to FIG. 12 taking as an example the business process definition object "research material order transaction definition (541)" shown in FIG. 13. Here, the owner name BP_START means a start point of a business process, and BP_END means an end point thereof. Because the owner of the digitized document object "order document 0705 (524)" is user C (103), the place of #user C in the business process definition object is first examined. In the place of #user C, it is found from the description in the place bracketed in proc( ) that a digitized document object of a digitized document type "order document" is delivered to user D (104) who is the next user.

Returning to the description of FIG. 15, in step 1536, the digitized document object is delivered to the next user obtained in the step 1535. After delivery, the situation of the routine goes to step 1537.

Figure 17:
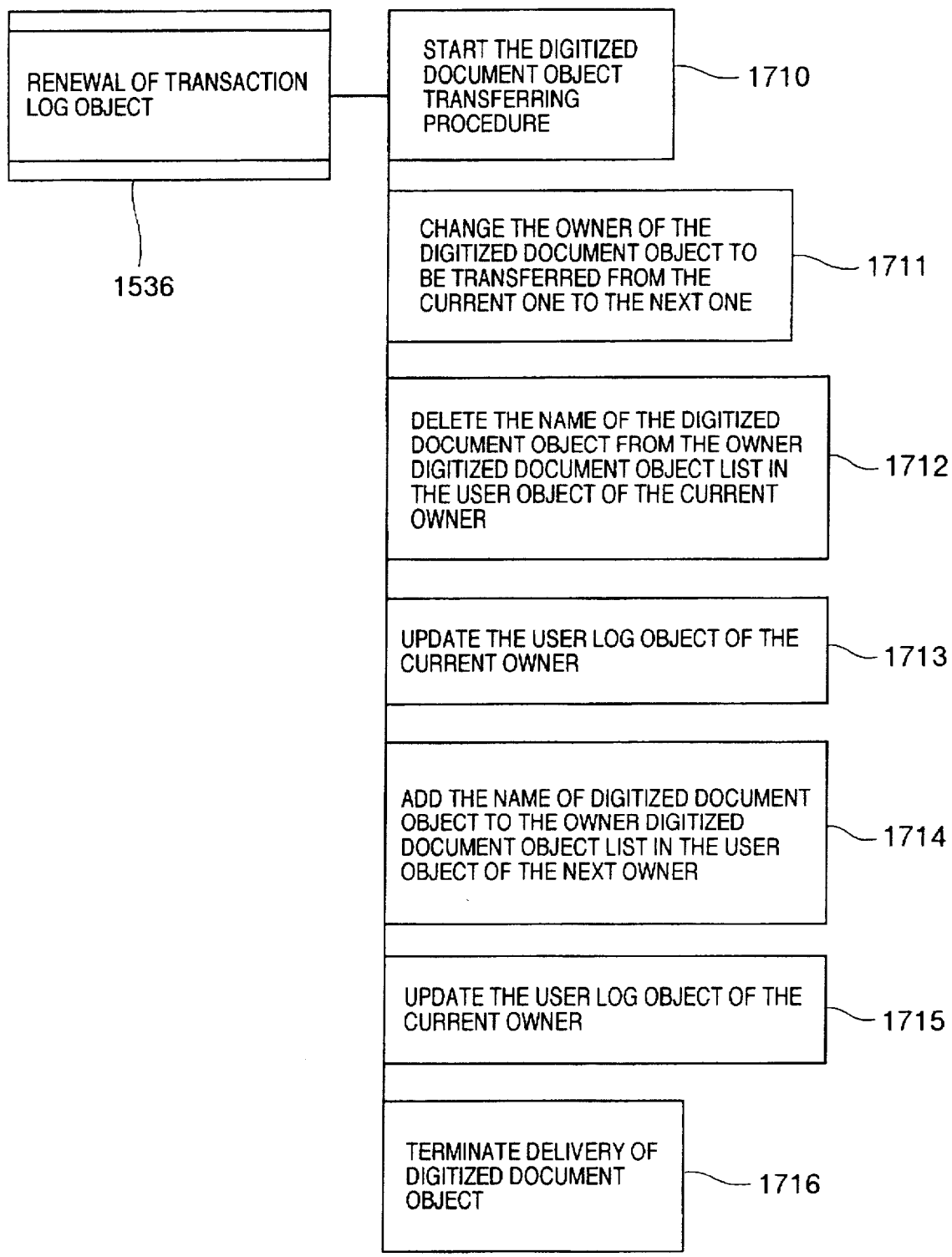
FIG. 17 is a PAD view of a digitized document object delivery program 1412 in FIG. 14.

FIG. 17 is a PAD view showing the digitized document object transferring procedure of the step 1536. Here, the procedure of transferring a digitized document object "order document 0705 (524)" from user C who is the current owner to user D who is the next owner will be described with reference to FIG. 17. In step 1710, the digitized document object transferring procedure starts and the situation of the routine goes to step 1711. In the step 1711, the owner of the digitized document object to be transferred is changed from the current owner to the next owner obtained in the step 1535 and then the situation of the routine goes to step 1712. Here, the owner of the digitized document object "order document 0705 (524)" is changed from user C to user D. In the step 1712, the name of the digitized document object is deleted from the owner digitized document object list in the user object of the current owner and then the situation of the routine goes to step 1713. Here, "order document 0705" is deleted from the owner digitized document object list in the user object "user C (513)". In the step 1713, a log is added to the user log object of the current owner and the situation of the routine goes to step 1714. Here, a log "1994/07/06 16:45" indicating the current time 16:45 Jul. 6, 1994 is added as time to the user log object "log user C (553)" of the user C (103); a log "request document 0705" is added as a digitized document object; and a log "send" is added as an operation. In the step 1714, the name of a digitized document object to be transferred is added to the owner digitized document object list in the user object of the next owner and the situation of the routine goes to step 1715. Here, "order document 0705" is added to the owner digitized document object list in the user object "user D (514)". In the step 1715, a log is added to the user log object of the next owner and the situation of the routine goes to step 1716. Here, a log "1994/07/06 16:45" indicating the current time 16:45 Jul. 6, 1994 is added as time to the user log object "log user C (554)" of the user D; a log "order document 0705" is added as a digitized document object; and a log "receive" is added as an operation. In the step 1716, the digitized document object transferring procedure is terminated. By the aforementioned procedure, the digitized document object transferring process 1536 is performed.

Returning to the description of FIG. 15, in the step 1537, the transaction log object which is characteristic of the digitized document circulating system provided by the present invention is updated and the situation of the routine goes to step 1538 after the updating of the transaction log object.

Figure 18:
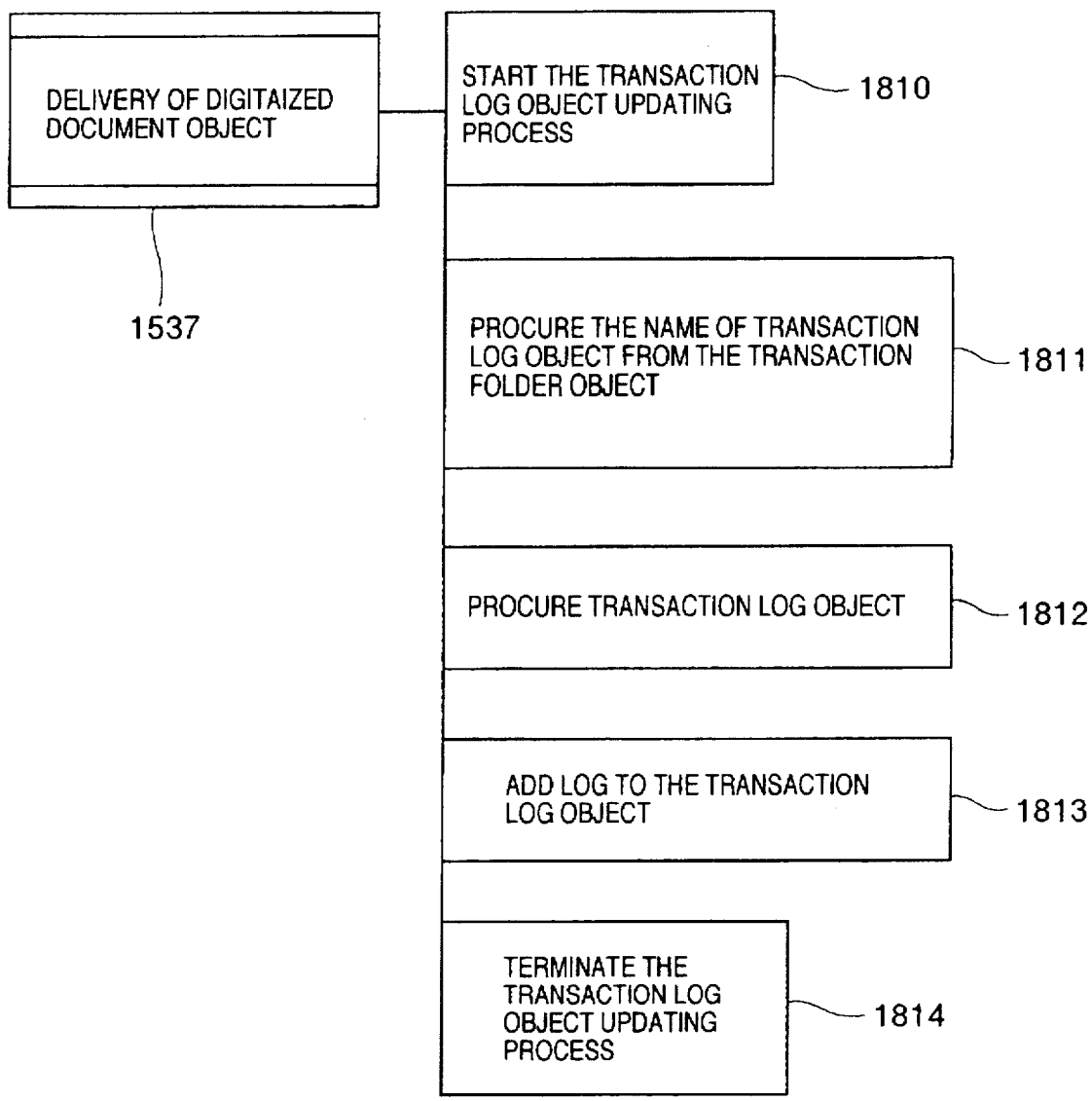
FIG. 18 is a PAD view of a transaction log object updating program 1413 in FIG. 14.

FIG. 18 is a PAD view showing a procedure of updating the transaction log object. In this embodiment, a transaction log object updating process in the case where a digitized document object "order document (524)" is transferred from user C who is the current owner to user D who is the next user will be described with reference to FIG. 18. In step 1810, the transaction log object updating process starts. In step 1811, the name of a transaction log object is procured from the transaction folder object. Here, the transaction log object name "log research material order 0705" is procured from the transaction folder object "research material order 0705 (532)" of the digitized document object "order document 0705 (524)" obtained in the step 1532. In step 1812, a transaction log object is procured from the transaction log object name obtained in the step 1811. Here, the transaction log object "log research material order 0705" (562) is obtained. In step 1813, a log is added to the transaction log object. Here, a log "1994/07/06 16:45" indicating the current time 16:45 Jul. 6, 1994 is added as time to the transaction log object "log research material order 0705 (562)"; a log "order document 0705" is added as a digitized document object; a log "user C" is added as the source; and a log "user D" is added as the destination. In the step 1814, the transaction log object updating process is terminated. By the aforementioned procedure, the transaction log object updating process 1537 is performed.

Incidentally, the server 211 procures the name of a source user and the name of a destination user from the digitized document object of the source and the digitized document object of the destination by a processing program not shown. Further, the server 211 procures user objects corresponding to the user names and procures user log object names from these user objects and updates user log objects corresponding to the user log object names.

Figure 19:
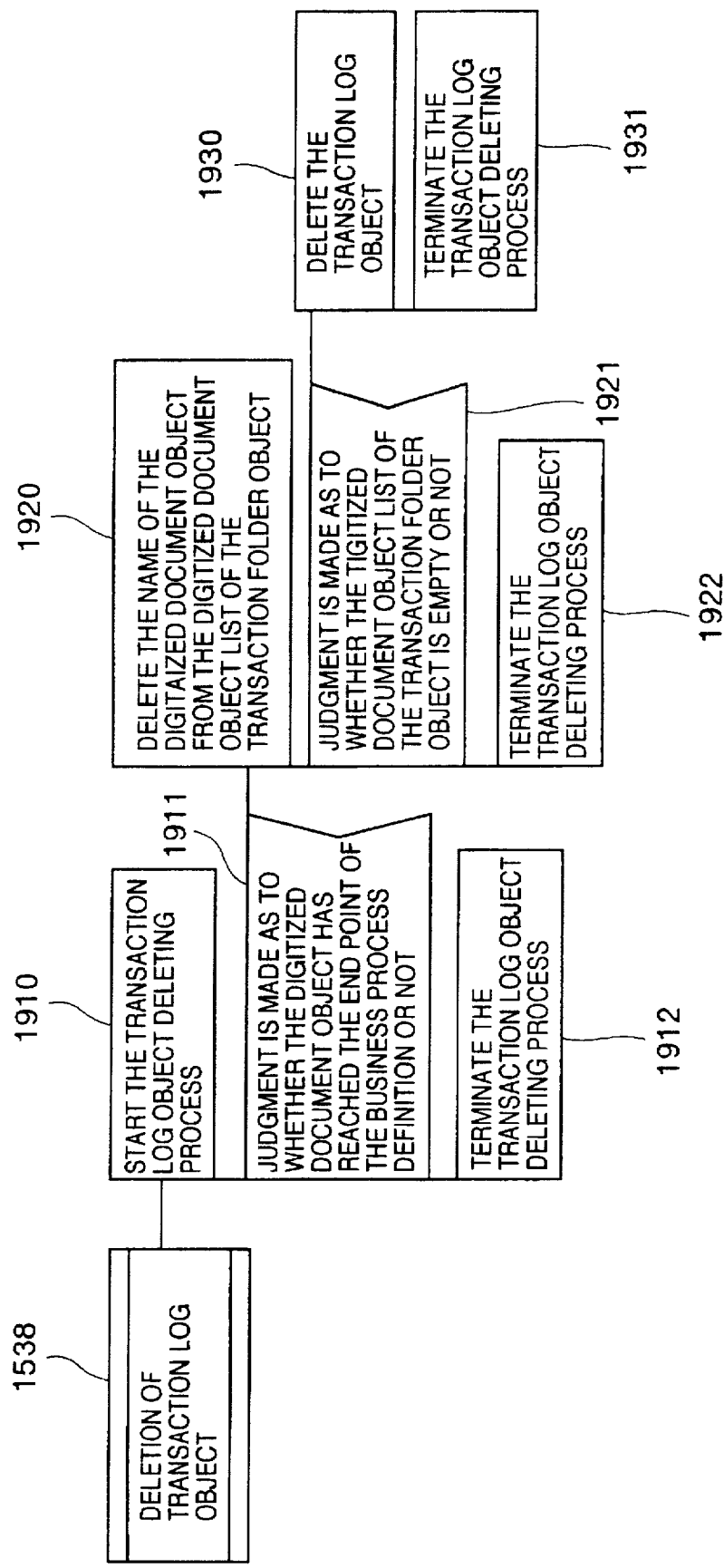
FIG. 19 is a PAD view of a transaction log object deleting program 1414 in FIG. 14.

In the step 1538 shown in FIG. 15, the transaction log deleting process which is characteristic of the present invention is carried out. FIG. 19 is a PAD view showing a transaction log deleting procedure.

In step 1910, the transaction log object deleting process starts and the situation of the routine goes to step 1911. In the step 1911, the source of the digitized document object transferred in the step 1536 is examined so that a judgment is made as to whether the digitized document object has reached the end point of the business process definition or not. Because the digitized document object has not reached the end point of the business process definition when the destination is BP_END, the procedure in and after step 1920 is carried out. When the destination is BP_END, procedure of step 1912 is carried out. In the step 1912, the transaction log object deleting process is terminated. In the step 1920, the name of the digitized document object is deleted from the management digitized document object list of the transaction folder object which manages the digitized document object transferred in the step 1536. In step 1921, a judgment is made as to whether the management digitized document object list of the transaction folder object managing the digitized document object transferred in the step 1536 is empty or not. Only the names of digitized document objects currently used for circulation are stored in the management digitized document object list. By examining whether the management digitized document object list is empty or not, a judgment can be made as to whether the circulation of all digitized document objects managed by the transaction folder object is completed or not. When the list is not empty, the procedure of step 1922 is carried out. When the list is empty, the procedure in and after step 1930 is carried out. In the step 1922, the transaction log object deleting process is terminated. In the step 1930, the transaction log object is deleted. In step 1931, the transaction log object deleting process is terminated.

By the aforementioned procedure, the transaction log object is deleted when the circulation of all digitized document objects managed by the transaction folder object is terminated. The termination of the circulation of all digitized document objects managed by the transaction folder object indicates the fact that the transaction is finished. Because the significance of the transaction log is considered to be lowered as the transaction is finished, the useless transaction log object is deleted to save the storage capacity.

(4-2-2) Digitized Document Circulating Procedure in User Terminal

Figure 20:
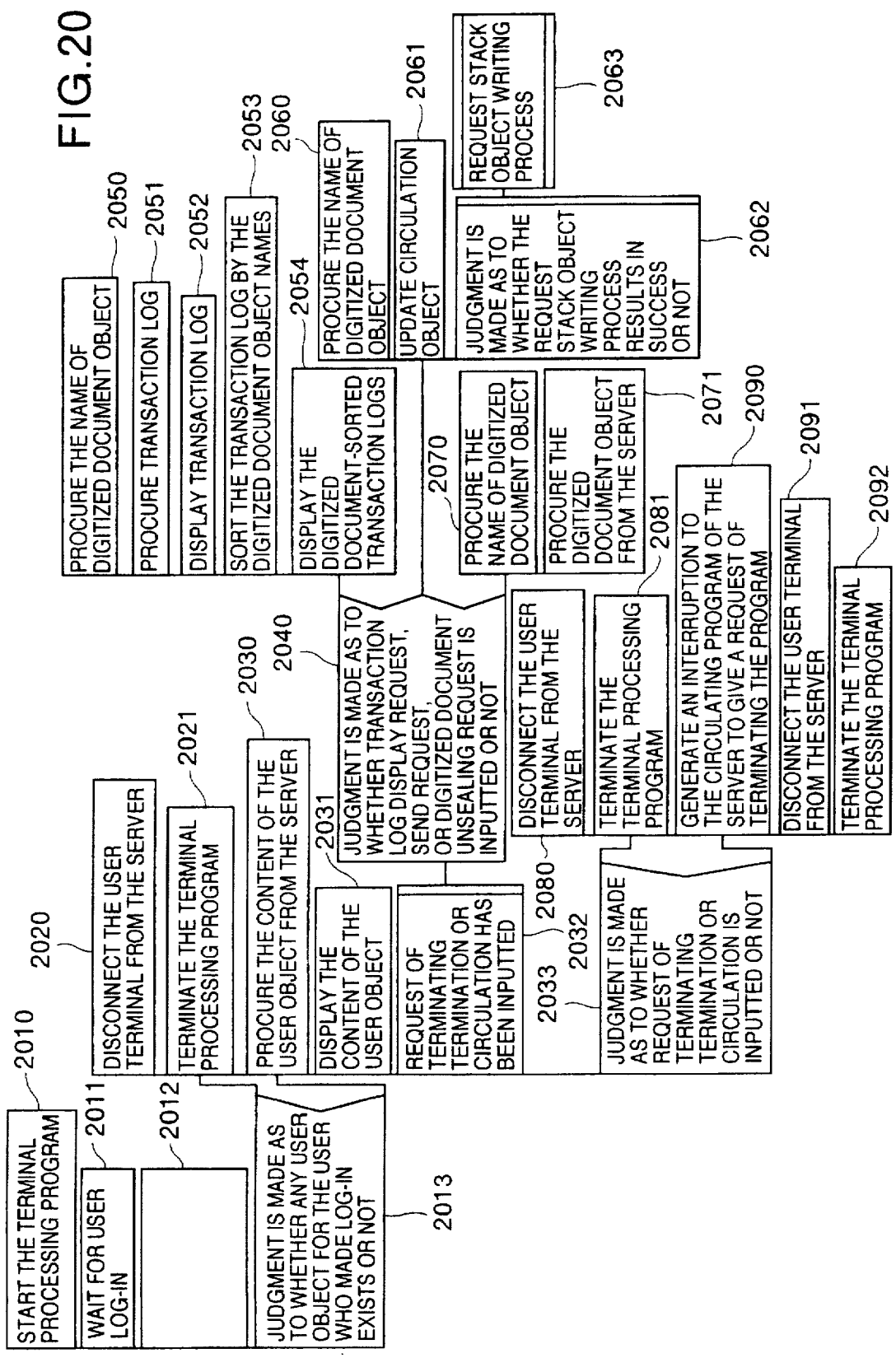
FIG. 20 is a PAD view of a terminal processing program 431 in FIG. 4.

The digitized document circulating procedure in a user terminal is described in the processing program 431. The procedure shown in the PAD view of FIG. 20 is described in the processing program 431. In step 2010, the terminal processing program starts and the situation of the routine goes to step 2011. In the step 2011, success of log-in (process of inputting user name and password through the keyboard) of the user to the user terminal is waited for. When the log-in results in success, the situation of the routine goes to step 2012. Here, description will be made upon the assumption that the user C makes log-in from the user terminal 212. In the step 2012, lines of the user terminal 212 and the server 211 are first connected by using the terminal network connection unit 410 of the user terminal 212, the network system 218 and the network unit 310 of the server 211. In step 2013, a judgment is made as to whether any user object for the user which made log-in to the user terminal exists in the server 211 or not. When there is no user object, the situation of the routine goes to step 2020 because the user cannot use the digitized document circulating system. When there is any user object, the situation of the routine goes to step 2030. Because the user object "user C (513)" for the user C (103) exists in the user object block 510, the procedure in and after the step 2030 is carried out. In the step 2020, the line connected in the step 2012 is turned off to disconnect the user terminal from the server. In step 2021, the terminal processing program is terminated. In the step 2030, the content of the user object is procured from the server 211 through the network system 218. Now, assume that the user object "user C (513)" is procured. In step 2031, the content of the user object procured in the step 2030 and a processing menu to the user are displayed on the display unit 443.

FIG. 21 shows an example of display. A menu for processes in the user terminal is displayed on a display area 2110. By clicking a mouse 442 on one of buttons 2111 to 2115, an instruction to execute a function assigned to the button can be given to the processing unit 420 through the user interface connection unit 440. A function of unsealing the circulated digitized document object is assigned to the unsealing button 2111; a function of requesting the sending of the digitized document is assigned to the sending button 2112; a function of displaying the transaction log is assigned to the transaction log display button 2113; a function of terminating the user terminal 212 is assigned to the user terminal termination button 2114; and a function of terminating the server 211 and the user terminal 212 is assigned to the digitized document circulation termination button 2115. The name of the user which currently uses the user terminal is displayed on a display area 2120. Now, "user C" is displayed. As digitized documents possessed by the user, the names of digitized document objects contained in the owner digitized document object list in the user object are displayed on a display area 2130. An input area 2131 is an area in which the user designates or inputs the number displayed together with the name of a digitized document object by using the keyboard 441 so that the digitized document object to be subjected to terminal processing is selected from the digitized document object names displayed on the display area 2130. As the work history of the user, user log objects for user objects are displayed in the form of a table on a display area 2141. As for the user log objects, when a procuring request with the user name is sent from the user terminal to the server 211, the server 211 obtains a corresponding user object on the basis of the user name, obtains the name of a corresponding user log object on the basis of the user object and sends the corresponding user log object to the user terminal. In this embodiment, the log user C (553) of the user log object is displayed on the basis of the user C (513) of the user object.

Returning to the description of FIG. 20, in the step 2032, inputting the user's request by using a button is waited for. When the user terminal termination button 2114 or the circulation termination button 2115 is pushed, the situation of the routine goes to step 2033. When any other button is pushed, the situation of the routine goes to step 2040. In the step 2033, in the case where as the terminal processing termination button is pushed so that a request to terminate the terminal processing is inputted, the situation of the routine goes to step 2080. When the circulation button is pushed so that a request to terminate the circulation is inputted, the situation of the routine goes to step 2090. In the step 2080, the line connected to the server 211 in the step 2012 is disconnected and then the situation of the routine goes to step 2081. In the step 2081, the terminal processing program is terminated. In the step 2090, an instruction to terminate the circulating program is inputted when the circulating main program 1410 of the server 211 executes the step 1511, and then the situation of the routine goes to step 2091. In the step 2091, the line connected to the server 211 in the step 2012 is disconnected and then the situation of the routine goes to step 2092. In the step 2092, the terminal processing program is terminated. In the step 2040, processing is branched correspondingly to the button pushed in the step 2032.

When the unsealing button 2111 is pushed, the situation of the routine goes to step 2070 so that a digitized document unsealing process is carried out in steps 2070 and 2071. The digitized document unsealing process is a process in which a circulation object as the content of the digitized document received by the user is copied from the server 211 onto the circulation object work area 433 of the user terminal through the network system 218 in order to edit the digitized document by using an application program contained in the application program block 432.

When the sending button 2112 is pushed, the situation of the routine goes to step 2060 so that a digitized document sending process is carried out in steps 2060 to 2063. The digitized document sending process is a process in which the name of a digitized document required to be sent is written into the request stack object 571 of the server 211 so that the digitized document is delivered to the next user in accordance with the digitized document circulating procedure of the server 211.

When the transaction log display button 2113 is pushed, the situation of the routine goes to step 2050 so that a transaction log display process is carried out in steps 2050 to 2054. The transaction log display process is a process for displaying the transaction log of the transaction in which the digitized document designated by the user is circulated.

(4-2-2-1) Digitized Document Unsealing Process

In the step 2070 of FIG. 20, the selection number inputted to the input area 2130 by the user is first procured. Then, the name of a digitized document object corresponding to the selection number is procured from the digitized document object name list displayed on the display area 2131, and then the situation of the routine goes to step 2071. When the selection number corresponding to a digitized document required to be unsealed is inputted to the input area 2130 by the user while referring to the display area 2131, the name of the digitized document object required to be unsealed by the user is obtained in this step. Assuming now that the user C gives "1" to the display area 2130, then "order document 0705" is obtained as the name of the digitized document object to be unsealed.

In the step 2071, a digitized document object is procured from the digitized document object name obtained in the step 2070, so that circulation objects in a circulation object list for the digitized document object are copied from the server 211 onto the circulation object work area 433 through the network system 218, and then the situation of the routine goes to step 2032.

When the digitized document object name obtained in the step 2070 is "order document 0705", the digitized document object "order document 0705 (524)" is procured and "order0705 .txt" and "order0705 .bmp" are copied as circulation objects onto the circulation object work area 433.

After the terminal processing is terminated, the user can edit the copies of the circulation objects on the circulation object work area 433 by using an application program contained in the application program block 432.

(4-2-2-2) Digitized Document Sending Process

In the step 2060, the selection number inputted to the input area 2130 by the user is first procured. Then, the name of a digitized document object corresponding to the selection number is procured from the digitized document object name list displayed on the display area 2131 and then the situation of the routine goes to step 2061. When the selection number corresponding to a digitized document requested to be sent is given to the input area 2130 by the user while referring to the display area 2131, the name of the digitized document object required to be sent by the user is obtained in this step. When the user C gives "1" to the display area 2130, "order document 0705" is obtained as the name of the digitized document object to be sent.

In the step 2061, a digitized document object is first procured from the digitized document object name obtained in the step 2060, so that the names of circulation objects constituting the digitized document object are procured. Then, circulation objects constituting the digitized document are overwritten from the circulation object work area 433 onto the circulation objects stored in the circulation object block of the server 211 through the network system 218, and then the situation of the routine goes to step 2602.

When the digitized document object name obtained in the step 2060 is "order document 0705", "order0705 .txt" and "order0705 .bmp" from the circulation object work area 433 are respectively overwritten onto "order0705 .txt" and "order0705 .bmp" contained in the circulation object block of the server 211. Accordingly, the next user whom the digitized document object "order document 0705 (524)" is circulated receives the digitized document object "order document 0705 (524)" edited by the user C.

In the step 2062, a judgment is made as to whether the request stack object writing process results in success or not. Unless the request stack object writing process results in success, the procedure of the step 2063 is repeated. When the request stack object writing process results in success, the situation of the routine goes to step 2032.

In the step 2063, the digitized document object name of the digitized document object to be subjected to a sending process is written into the request stack object 571 of the server 211 and the situation of the routine goes to step 2062.

Here, FIG. 22 is a PAD view showing the request stack writing process 2063. In FIG. 22, n__max is the maximum number of stacks for request stack objects. In step 2210, the request stack object writing process starts. In step 2211, the initial value of n which is a variable for counting the request number is set to "1". In step 2212, in order to examine the request number for writing the queue digitized document object name, the procedure in and after step 2220 is repeated unless the queue digitized document of the request number n in the request stack object 571 is "none". When the queue digitized document of the request number n in the request stack object 571 is "none", the situation of the routine goes to step 2213. In the step 2213, the name of the digitized document object required to be sent is written into the queue digitized document object of the request number n in the request stack object 571. In step 2214, the request stack object writing process is terminated. In the step 2220, the situation of the routine goes to step 2230 as long as the relation n<n__max is valid. When n<n__max is invalid, the situation of the routine goes to step 2240. In the step 2230, the request number n is increased by 1 and the situation of the routine goes to the step 2212. In the step 2240, the request stack writing process is terminated abnormally (the request stack writing process results in failure) because there is no space for the digitized document to be written in the request stack.

By the aforementioned process, the digitized document object name of the digitized document object to be subjected to the sending process is written into the request stack object 571 of the server 211. When the digitized document object name obtained in the step 2060 is "order document 0705" and the request stack object writing process results in success, the digitized document object name "order document 0705" sent by the user C is written into the request stack object 571. The digitized document object "order document 0705 (524)" in which the name is written into the request stack object 571 is circulated to the next user by a process based on the circulating main program 1410 of the server 211 as described above.

(4-2-2-3) Transaction Log Display Process

The transaction log display process which is characteristic of the present invention will be described below. In step 2050, the selection number given to the input area 2140 by the user is first procured. Then, names of digitized document objects constituting a log corresponding to the selection number are procured from user logs which are the contents of user log objects displayed on the display area 2141 and then the situation of the routine goes to step 2051.

The input area 2140 is an area in which the number displayed together with a log containing the name of a digitized document object is designated or inputted by the user through the keyboard 441 so that a digitized document object to be displayed on the transaction log is designated from the user log objects displayed on the display area 2141. When the selection number corresponding to a log containing the digitized document object required for displaying the transaction log is given to the input area 2140 by the user while referring to the display area 2141, the name of the digitized document object required for displaying the transaction log by the user is obtained. The input area 2130 may be used in the same manner as in the digitized document object unsealing process or in the digitized document object sending process so that the selection number corresponding to the name of a digitized document object currently possessed by the user is designated or inputted by the user. When the user C gives the selection number "2" to the input area 2140, "order document 0705" is designated as the name of the digitized document object for displaying the transaction log.

In step 2051, a digitized document object is first procured from the server 211 by using the digitized document object name procured in the step 2050. In the server 211, the digitized document object block 520 is searched for the target digitized document object and the target digitized document object is delivered to the user terminal. Then, a transaction folder object for managing the digitized document object is procured from the server 211 by using the transaction folder name of the digitized document object. In the server 211, the transaction folder object block 530 is searched for the target transaction folder object and the target transaction folder object is delivered to the user terminal. Finally, a transaction log object concerning the transaction folder object is procured by using the transaction log object name of the transaction folder object. In the server 211, the transaction log designated is read and delivered to the user terminal. Then, the situation of the routine goes to step 2052.

When "order document 0705" is designated as the name of the digitized document object for displaying the transaction log in the step 2050, a transaction folder object "research material order 0705 (532)" and a transaction log object "log research material order 0705 (562)" are procured in this step.

In the step 2052, as exemplified in FIG. 23, the transaction log received from the server 211 is displayed in the form of a table on the display area 2310 of the display 413 of the user terminal 212; the digitized document object name obtained in the step 2050 is displayed on the display area 2311; the transaction folder name obtained in the step 2051 is displayed on the display area 2312; and then the situation of the routine goes to step 2053.

When the transaction folder object "research material order 0705 (532)" and the transaction log object "log research material order 0705 (562)" are procured in the step 2051, the transaction log object "log research material order 0705 (562)" is displayed on the display area 2310; the digitized document object name "order document 0705" is displayed on the display area 2311; and the transaction object name "research material order 0705" is displayed on the display area 2312.

By this process, the user C can procure the transaction log object "log research material order transaction 0705 (562)" containing the circulation history of the digitized document object "order document 0705 (524)" circulated to the user C on the basis of the user log object "log user C (553)" displayed on the display area 2141. Because the transaction log object "log research material order transaction 0705 (562)" is the circulation history of the digitized document objects "decision document 0705 (523)" and "order document 0705 (524)" belonging to one and the same transaction, the circulation history of the digitized document object "decision document 0705 (523)" which is not circulated to the user C can be provided to the user C.

Although the aforementioned embodiment has shown the case where the transaction folder name and the transaction log object name are given on the user terminal side, the present invention can be applied to the case where the transaction folder name and the transaction log object name are procured successively from the server 211 by a sample operation of inputting the digitized document object name so that the target transaction log is automatically decided.

In the step 2053, digitized document object names which appear in the transaction log is first extracted from the transaction log. Then, the transaction log is sorted by the digitized document object names thus extracted, and then the situation of the routine goes to step 2054. In the sorting of the transaction log by the digitized document object names, digitized document object names recorded in the transaction log are omitted because they are not necessary. In the case of a transaction log object "log research material order 0705 (562)", digitized document object names "decision document 0705" and "order document 0705" are extracted, so that transaction log objects are sorted by the digitized document object names, respectively. Digitized document-sorted transaction logs obtained by sorting the transaction log by the digitized document object names are shown in FIGS. 24 and 25.

In step 2054, the digitized document-sorted transaction logs are displayed and then the situation of the routine goes to step 2032. In the case of digitized document-sorted transaction logs shown in FIGS. 24 and 25, the digitized document-sorted transaction log based on the digitized document object "decision document 0705 (523)" is displayed on the display area 2320 and the digitized document object name "decision document 0705" is displayed on the display area 2321. The digitized document-sorted transaction log based on the digitized document object "order document 0705 (522)" is displayed on the display area 2330 and the digitized document object name "order document 0705" is displayed on the display area 2331.

It may be difficult to see the transaction log object "log research material order transaction 0705 (562)" displayed on the display area 2310, because the circulation histories of the digitized document objects "decision document 0705 (523)" and "order document 0705 (524)" belonging to one and the same transaction are mixed. Because the digitized documentsorted transaction logs displayed on the display areas 2320 and 2330 are obtained respectively by extracting a circulation history concerning a single digitized document object from the transaction log object "log research material order transaction 0705 (562)", each history can be presented so that the history can be easily read by the user who pays attention to a single digitized document object. Further, the digitized document-sorted transaction log obtained by extracting the circulation history concerning the digitized document object "decision document 0705 (523)" not circulated to the user C can be provided to the user C.

Although the aforementioned embodiment has shown the case where functions are assigned to the server 211 and the user terminal 212 as shown in FIGS. 3 and 4, the present invention is not limited thereto.

A first effect of the present invention is that each user of the digitized document circulating system can procure not only the history information of a digitized document circulated to the user but also the history information of another circulated digitized document contained in one and the same transaction of the digitized document circulated to the user. Hence, the user can make work progress while grasping the state of circulation of digitized documents contained in a transaction, so that smoother transaction management can be aided. For example, in a business process shown in FIG. 1, it is now assumed that the minimum requirement for the user E (105) making work progress is a set of documents, that is, the "decision document" 111 and "order document" 112.

Assume that a transaction log as expressed in the display area 2310 of FIG. 23 is procured by the user C (103) at 18:00 on Jul. 6, 1994. The user C (103) can know the fact that about 3 hours is passed after a digitized document, that is, the "decision document 0705" not circulated to the user C (103) has been already circulated to the user E (105). Accordingly, the processing of a digitized document "order document 0705" assigned to the user C can be preferentially hastened, so that the business process can be smoothened as a whole. Because in this manner one business process is managed more efficiently by such group work of a plurality of persons, a flow of the business process as a whole can be grasped while a user sees not only the state of process of a digitized document circulated to the user but also the state of another digitized document not circulated to the user but having influence on the user's work, so that the user can adjust the user's work correspondingly to the other work.

A second object of the present invention is that time, digitized document name and user name can be provided as a transaction log in addition to the first effect. The information concerning time, digitized document name and user name is important in fulfilling the first effect.

A third effect of the present invention is that a transaction log containing a digitized document which is now not possessed by a user because it has been sent to the next user can be procured by the user so that the state of progress of the transaction can be provided to the user. The user can follow up other users by referring to the transaction log.

A fourth effect of the present invention is that storage capacity can be saved by deleting the transaction log of a transaction when the circulation of all digitized documents belonging to the transaction is completed. When the circulation of all digitized documents belonging to the transaction is completed, the significance of the history of each digitized document is generally lowered, so that necessity of the transaction log is reduced. Accordingly, the unnecessary transaction log can be deleted so that storage capacity can be saved.

A fifth effect of the present invention is that transaction log data are displayed so as to be separated by digitized documents when a transaction log is displayed in a user terminal, so that the transaction log in which a plurality of digitized documents and data concerning users are mixed can be displayed so as to be easy to read. The transaction log is an information sequence concerning a plurality of digitized documents and user data belonging to one and the same transaction. When a transaction is displayed in a user terminal, the transaction log can be not only collectively displayed but also displayed as auxiliary data while sorting the transaction log by users or digitized documents. Accordingly, the users' understanding can be helped.

What is claimed is:

1. A digitized document circulating system circulating a digitized document among a plurality of user terminals connected via a communication network, comprising:

means for sending a digitized document, said sending means is provided in a transmission source user terminal of said digitized document;

means for delivering said digitized document to a transmission destination user terminal to thereby circulate said digitized document;

means for receiving said digitized document, said receiving means is provided in said transmission destination user terminal;

means for creating a circulation history containing delivery time, an identifier of said digitized document, said transmission source user terminal and said transmission destination user terminal, said creating means is operated by said delivery means;

means for reading said circulation history and transferring said circulation history to a requester in response to a request for said circulation history issued from said requester, a user terminal other than said transmission source user terminal and said transmission destination user terminal being included as said requester; and means for displaying said circulation history received by said requester.

2. A digitized document circulating system according to claim 1, further comprising:

storage means for storing a business process definition in which a flow of circulation of said digitized document from start to end of said circulation is defined on the basis of transmission source user terminals and transmission destination user terminals; and means for determining a next transmission destination user terminal by referring to said business process definition stored in said storage means.

3. A digitized document circulating system according to claim 2, further comprising:

means for storing a transaction folder correlating the identifier of said digitized document with said business process definition; and means for determining the correlated business process definition by referring to said transaction folder stored in said storage means.

4. A digitized document circulating system according to claim 3, wherein:

said transaction folder includes an identifier for the circulation history correlated with said identifier of said digitized document and with said business process definition and, said digitized document circulating system further comprises means for determining the correlated circulation history by referring to said transaction folder.

5. A digitized document circulating system according to claim 1, further comprising:

means for obtaining, as a user log, histories of digitized documents circulated to respective users;

means for displaying said user log; and means for designating a specific digitized document from said user log to thereby determine the circulation history concerning said specific digitized document.

* * * * *